(12) United States Patent
Gollakota et al.

(10) Patent No.: US 10,873,363 B2
(45) Date of Patent: Dec. 22, 2020

(54) BACKSCATTER DEVICES AND NETWORK SYSTEMS INCORPORATING BACKSCATTER DEVICES

(71) Applicant: University of Washington, Seattle, WA (US)

(72) Inventors: Shyamnath Gollakota, Seattle, WA (US); Bryce Kellogg, Seattle, WA (US); Vamsi Talla, Seattle, WA (US); Joshua R. Smith, Seattle, WA (US)

(73) Assignee: University of Washington, Seattle, WA (US)

( * ) Notice: Subject to any disclaimer, the term of this patent is extended or adjusted under 35 U.S.C. 154(b) by 370 days.

(21) Appl. No.: 15/752,214

(22) PCT Filed: Aug. 12, 2016

(86) PCT No.: PCT/US2016/046899
§ 371 (c)(1),
(2) Date: Feb. 12, 2018

(87) PCT Pub. No.: WO2017/027847
PCT Pub. Date: Feb. 16, 2017

(65) Prior Publication Data
US 2020/0212956 A1 Jul. 2, 2020

Related U.S. Application Data

(60) Provisional application No. 62/204,382, filed on Aug. 12, 2015, provisional application No. 62/236,761, filed on Oct. 2, 2015.

(51) Int. Cl.
*H04B 1/713* (2011.01)
*H04B 7/0413* (2017.01)
*H04W 74/08* (2009.01)

(52) U.S. Cl.
CPC .......... *H04B 1/713* (2013.01); *H04B 7/0413* (2013.01); *H04W 74/0808* (2013.01)

(58) Field of Classification Search
CPC ..... H04B 5/0031; H04B 5/0062; H04W 4/80; H01Q 1/2216
See application file for complete search history.

(56) References Cited

U.S. PATENT DOCUMENTS 4,298,280 A 11/1981 Harney
4,916,460 A 4/1990 Powell
(Continued)

FOREIGN PATENT DOCUMENTS

CN 202713631 U 1/2013
EP 2975814 A1 1/2016
(Continued)

OTHER PUBLICATIONS

US 10,187,177 B2, 01/2019, Gollakota et al. (withdrawn)
(Continued)

*Primary Examiner* — Kevin Kim
(74) *Attorney, Agent, or Firm* — Dorsey & Whitney LLP

(57) ABSTRACT

Examples described herein include devices and systems utilizing backscatter communication to directly generate transmissions in accordance with wireless communication protocols that can be decoded existing devices. Examples include devices that generate 802.11b transmissions using backscatter communication. Examples of network stacks are described which may facilitate backscatter devices to coexist with other devices (e.g. in the ISM band), without incurring, or reducing a need for, the power consumption or carrier sense and medium access control operations.

24 Claims, 8 Drawing Sheets

(56) References Cited

U.S. PATENT DOCUMENTS

| | | |
|---|---|---|
| 5,164,985 A | 11/1992 | Nysen et al. |
| 5,220,330 A | 6/1993 | Salvail et al. |
| 5,321,599 A | 6/1994 | Tanamachi et al. |
| 5,649,296 A | 7/1997 | Maclellan et al. |
| 5,663,710 A | 9/1997 | Fasig et al. |
| 5,784,686 A | 7/1998 | Wu et al. |
| 5,873,025 A | 2/1999 | Evans et al. |
| 5,995,040 A | 11/1999 | Issler et al. |
| 6,016,056 A | 1/2000 | Seki |
| 6,084,030 A | 7/2000 | Pidwerbetsky et al. |
| 6,094,450 A | 7/2000 | Shockey |
| 6,107,910 A | 8/2000 | Nysen |
| 6,243,012 B1 | 6/2001 | Shober et al. |
| 6,259,406 B1 | 7/2001 | Brady et al. |
| 6,297,696 B1 | 10/2001 | Abdollahian et al. |
| 6,611,224 B1 | 8/2003 | Nysen et al. |
| 6,745,008 B1 | 6/2004 | Carrender et al. |
| 6,765,476 B2 | 7/2004 | Steele et al. |
| 6,838,989 B1 | 1/2005 | Mays et al. |
| 6,870,460 B2 | 3/2005 | Turner et al. |
| 6,970,089 B2 | 11/2005 | Carrender |
| 7,107,070 B2 | 9/2006 | Auffret et al. |
| 7,180,402 B2 | 2/2007 | Carrender et al. |
| 7,215,976 B2 | 5/2007 | Brideglall |
| 7,358,848 B2 | 4/2008 | Mohamadi |
| 7,469,013 B1 | 12/2008 | Bolt et al. |
| 7,535,360 B2 | 5/2009 | Barink et al. |
| 7,796,016 B2 | 9/2010 | Fukuda |
| 7,839,283 B2 | 11/2010 | Mohamadi et al. |
| 7,961,393 B2 | 6/2011 | Chiao et al. |
| 7,995,685 B2 | 8/2011 | Wang et al. |
| 8,026,839 B2 | 9/2011 | Weber |
| 8,120,465 B2 | 2/2012 | Drucker |
| 8,170,485 B2 | 5/2012 | Hulvey |
| 8,248,263 B2 | 8/2012 | Shervey et al. |
| 8,284,032 B2 | 10/2012 | Lee et al. |
| 8,391,824 B2 | 3/2013 | Kawaguchi |
| 8,526,349 B2 | 9/2013 | Fischer |
| 8,797,146 B2 | 8/2014 | Cook et al. |
| 8,952,789 B2 | 2/2015 | Dardari |
| 8,971,704 B2 | 3/2015 | Cavaliere et al. |
| 9,252,834 B2 | 2/2016 | Seller et al. |
| 9,312,950 B1 | 4/2016 | Deyle |
| 9,357,341 B2 | 5/2016 | Deyle |
| 9,680,520 B2 | 6/2017 | Gollakota et al. |
| 9,973,367 B2 | 5/2018 | Gollakota et al. |
| 10,033,424 B2 | 7/2018 | Gollakota et al. |
| 10,079,616 B2 | 9/2018 | Reynolds et al. |
| 10,270,639 B2 | 4/2019 | Gollakota et al. |
| 2002/0015436 A1 | 2/2002 | Ovard et al. |
| 2003/0043949 A1 | 3/2003 | O'Toole et al. |
| 2003/0133495 A1 | 7/2003 | Lerner et al. |
| 2003/0174672 A1 | 9/2003 | Herrmann |
| 2004/0005863 A1 | 1/2004 | Carrender |
| 2004/0210611 A1 | 10/2004 | Gradishar et al. |
| 2005/0053024 A1 | 3/2005 | Friedrich |
| 2005/0099269 A1 | 5/2005 | Diorio et al. |
| 2005/0201450 A1 | 9/2005 | Volpi et al. |
| 2005/0248438 A1 | 11/2005 | Hughes et al. |
| 2005/0253688 A1 | 11/2005 | Fukuda |
| 2005/0265300 A1 | 12/2005 | Rensburg |
| 2006/0044147 A1 | 3/2006 | Knox et al. |
| 2006/0045219 A1 | 3/2006 | Wang et al. |
| 2006/0082458 A1 | 4/2006 | Shanks et al. |
| 2006/0087406 A1 | 4/2006 | Willins et al. |
| 2006/0109127 A1 | 5/2006 | Barink et al. |
| 2006/0220794 A1 | 10/2006 | Zhu |
| 2006/0236203 A1 | 10/2006 | Diorio et al. |
| 2006/0261952 A1 | 11/2006 | Kavounas et al. |
| 2007/0018904 A1 | 1/2007 | Smith |
| 2007/0046434 A1 | 3/2007 | Chakraborty |
| 2007/0069864 A1 | 3/2007 | Bae et al. |
| 2007/0096876 A1 | 5/2007 | Bridgelall et al. |
| 2007/0100121 A1 | 5/2007 | Cohen |
| 2007/0111676 A1 | 5/2007 | Trachewsky et al. |
| 2007/0115950 A1 | 5/2007 | Karaoguz et al. |
| 2007/0201786 A1 | 8/2007 | Wuilpart |
| 2007/0210923 A1 | 9/2007 | Butler et al. |
| 2007/0285245 A1 | 12/2007 | Djuric et al. |
| 2007/0293163 A1 | 12/2007 | Kilpatrick |
| 2008/0068174 A1* | 3/2008 | Al-Mahdawi ........ H04B 5/0062 340/572.7 |
| 2008/0131133 A1 | 6/2008 | Blunt et al. |
| 2008/0136646 A1 | 6/2008 | Friedrich |
| 2008/0165007 A1 | 7/2008 | Drago et al. |
| 2008/0180253 A1 | 7/2008 | Ovard et al. |
| 2008/0207357 A1 | 8/2008 | Savarese et al. |
| 2008/0211636 A1 | 9/2008 | O'Toole et al. |
| 2008/0216567 A1 | 9/2008 | Breed |
| 2008/0225932 A1* | 9/2008 | Fukuda ............ G06K 19/07749 375/216 |
| 2008/0252442 A1 | 10/2008 | Mohamadi et al. |
| 2008/0278293 A1* | 11/2008 | Drucker ............... G06K 7/0008 340/10.4 |
| 2009/0099761 A1 | 4/2009 | Davis et al. |
| 2009/0189981 A1 | 7/2009 | Siann et al. |
| 2009/0201134 A1 | 8/2009 | Rofougaran |
| 2009/0243804 A1 | 10/2009 | Fukuda |
| 2009/0252178 A1* | 10/2009 | Huttunen ............ H04W 72/085 370/445 |
| 2010/0156651 A1 | 6/2010 | Broer |
| 2010/0271188 A1 | 10/2010 | Nysen |
| 2011/0053178 A1 | 3/2011 | Yang |
| 2011/0069777 A1 | 3/2011 | Hurwitz et al. |
| 2011/0080267 A1 | 4/2011 | Clare et al. |
| 2011/0260839 A1 | 10/2011 | Cook et al. |
| 2012/0001732 A1 | 1/2012 | Kawaguchi |
| 2012/0002766 A1 | 1/2012 | Kawaguchi |
| 2012/0051411 A1 | 3/2012 | Duron et al. |
| 2012/0099566 A1 | 4/2012 | Laine et al. |
| 2012/0112885 A1 | 5/2012 | Drucker |
| 2012/0245444 A1 | 9/2012 | Otis et al. |
| 2012/0311072 A1 | 12/2012 | Huang et al. |
| 2012/0313698 A1 | 12/2012 | Ochoa et al. |
| 2013/0028305 A1 | 1/2013 | Gollakota et al. |
| 2013/0028598 A1 | 1/2013 | Cavaliere et al. |
| 2013/0069767 A1 | 3/2013 | Ovard et al. |
| 2013/0176115 A1 | 7/2013 | Puleston et al. |
| 2013/0215979 A1 | 8/2013 | Yakovlev et al. |
| 2013/0223270 A1 | 8/2013 | Cheng |
| 2013/0265140 A1 | 10/2013 | Gudan et al. |
| 2013/0286959 A1 | 10/2013 | Lou et al. |
| 2013/0299579 A1 | 11/2013 | Manku |
| 2013/0322498 A1 | 12/2013 | Maquire |
| 2014/0016719 A1 | 1/2014 | Manku |
| 2014/0044233 A1 | 2/2014 | Morton |
| 2014/0113561 A1 | 4/2014 | Maguire |
| 2014/0313071 A1 | 10/2014 | Mccorkle |
| 2014/0357202 A1* | 12/2014 | Malarky .................. H04B 1/62 455/84 |
| 2014/0364733 A1 | 12/2014 | Huang et al. |
| 2015/0091706 A1* | 4/2015 | Chemishkian .......... H02J 50/20 340/10.34 |
| 2015/0108210 A1 | 4/2015 | Zhou |
| 2015/0168535 A1 | 6/2015 | Httner et al. |
| 2015/0311944 A1 | 10/2015 | Gollakota et al. |
| 2015/0381269 A1 | 12/2015 | Deyle |
| 2016/0094933 A1 | 3/2016 | Deyle |
| 2016/0266245 A1 | 9/2016 | Bharadia et al. |
| 2016/0366890 A1 | 12/2016 | Reynolds et al. |
| 2017/0180075 A1 | 6/2017 | Gollakota et al. |
| 2017/0180178 A1 | 6/2017 | Gollakota et al. |
| 2017/0180703 A1 | 6/2017 | Kovacovsky et al. |
| 2017/0331509 A1 | 11/2017 | Gollakota et al. |
| 2018/0024224 A1 | 1/2018 | Seller |
| 2018/0331865 A1 | 11/2018 | Ziv et al. |
| 2018/0358996 A1 | 12/2018 | Gollakota et al. |
| 2018/0375703 A1 | 12/2018 | Kellogg et al. |
| 2019/0116078 A1 | 4/2019 | Gollakota et al. |
| 2019/0158341 A1 | 5/2019 | Talla et al. |
| 2020/0052734 A1 | 2/2020 | Talla et al. |
| 2020/0125916 A1* | 4/2020 | Karani ............... G06K 19/0702 |

(56) References Cited

U.S. PATENT DOCUMENTS

FOREIGN PATENT DOCUMENTS

| EP | 2976734 | | 1/2016 |
|---|---|---|---|
| WO | 2014153516 | A1 | 9/2014 |
| WO | 2015123306 | A1 | 8/2015 |
| WO | 2015123341 | A1 | 8/2015 |
| WO | 2016100887 | A2 | 6/2016 |
| WO | 2017027847 | A1 | 2/2017 |
| WO | 2017132400 | A1 | 8/2017 |
| WO | 2017176772 | A1 | 10/2017 |
| WO | 2018075653 | A1 | 4/2018 |
| WO | 2018187737 | A1 | 10/2018 |

OTHER PUBLICATIONS

US 10,187,241 B2, 01/2019, Gollakota et al. (withdrawn)
65 nm Technology by TSMC, http://www.tsmc.com/english/dedicatedFoundry/technology/65nm.htm, 2016.
915mhz Whip, Straight RF Antenna by Nearson. ftp://ftp2.nearson.com/Drawings/Antenna/S463XX-915.pdf.
A 5.1-µW UHF RFID Tag Chip Integrated With Sensors for Wireless Environmental Monitoring, Proceedings of ESSCIRC, Sep. 2005, p. 279-282.
ADG904 by Analog Devices, https://www.analog.com/media/en/technical-documentation/data-sheets/ADG904.pdf, Feb. 2016.
Altera's Cyclone V FPGAS, https://www.altera.com/products/fpga/cycloneseries/cyclone-v/overview.html, Feb. 11, 2020.
AN1200.22 LoRa Modualtion Basics, www.semtech.com, May 2015.
Atmel 9399 ATA8520D Sensitivity Measurment, Oct. 2015, http://www.atmel.com/Images/Atmel-9399-ATA8520-Sensitivity-Measurement_Application-Note.pdf.
Cadence Spectre RF, http://www.cadence.com/products/rf/spectre_rf_simulation/pages/default.aspx, retrieved on Feb. 20, 2020.
CC2630 Simplelink 6LoWPAN, Zigbee Wireless MCU, Texas Instruments, http://www.ti.com/lit/ds/symlink/cc2630.pdf, Jul. 2016.
CC2640 Simplelink Bluetooth Wireless MCU, Texas Instruments, http://www.ti.com/lit/ds/symlink/cc2640.pdf, Jul. 2016.
CC3200 Simplelink Wifi and Internet-of-Things Solution, a Single-Chip Wireless MCU, http://www.ti.com/product/CC3200/samplebuy, Feb. 2017.
CC3200 Simplelink Wifi and Internet-of-Things Solution, a Single-Chip Wireless MCU, Texas Instruments, http://www.ti.com/lit/ds/symlink/cc3200.pdf, Feb. 2015.
DC Ultra: Concurrent Timing, Area, Power, and Test Optimization, http://www.synopsys.com/Tools/Implementation/RTLSynthesis/DesignCompiler/Pages/default.aspx, Synopsys, 2019, 2 pages.
DE0-CV Development Kit, terasIC, http://www.terasic.com.tw/cgi-bin/page/archive.pl?Language=English&CategoryNo=163&No=921&PartNo=2, Feb. 2020.
Deep Space Network, NASA Jet Propulsion Laboratory, California Institute of Technology, http://deepspace.jpl.nasa.gov, Feb. 2020.
EFL 700A39 Stmicroelectronics, Battery Products, Digikey, https://www.digikey.com/product-detail/en/stmicroelectronics/EFL700A39/497-15109-ND/5052990, retrieved on Feb. 20, 2020.
Flexible, Printed and Thin Film Batteries 2019-2029: Idtechex, www.idtechex.com/en/research-report/flexible-printed-and-thin-film-batteries-2019-2029/634, Feb. 11, 2020.
High Ionic Conductivity, https://www.brightvolt.com/our-technology/, Feb. 11, 2020.
How Much Does an RFID Tag Cost Today?, RFID Journal, https://www.rfidjournal.com/faq/show?85, Feb. 2016.
Intel Cyclone V FPGAS, https://www.intel.com/content/www/us/en/products/programmable/fpga/cyclone-v.html, Feb. 11, 2020.
Lora Alliance, https://www.lora-alliance.org/, Feb. 2016.
LTE Evolution for IOT Connectivity, http://resources.nokia.com/asset/200178, Nokia, Jul. 2016.
National Instruments: What Is Labview?, https://www.ni.com/en-us/shop/labview.html, Feb. 2020.
Nearson Inc. S463AH-915, https://www.digikey.com/product-detail/en/nearson-inc/S463AH-915/730-1052-ND/4571854, Feb. 2020.
Semtech SX1276 Transceiver, https://www.semtech.com/products/wireless-rf/lora-transceivers/sx1276, Semtech, 2016.
Semtech SX1276IMLTRT, https://www.mouser.com/ProductDetail/Semtech/SX1276IMLTRT?qs=rBWM4%252BvDhIceYQoeMKd%2FQQ%3D%3D, Mouser Electronics, 2016.
Sigfox Developers, https://www.sigfox.com/en/sigfox-developers, Sigfox, 2010.
Sigfox Products, https://radiocrafts.com/products/sigfox/#Documentation, Radiocrafts Embedded Wireless Solutions, 2017.
Sigfox vs. Lora: A Comparison Between Technologies & Business Models, LinkLabs, May 2018, 15 pages.
The Alien Technology ALN-9640 Squiggle Is a High-Performance General-Purpose RFID Inlay for Use in a Wide Variety of Applications, www.alientechnology.com, Feb. 7, 2014.
TI CC2650, http://www.digikey.com/product-detail/en/CC2650F128RHBR/CC2650F128RHBR-ND/5189550, Digi-Key Electronics, 2019.
USB-6361 Multifunction I/O Device, http://sine.ni.com/nips/cds/view/p/lang/en/nid,209073, National Instruments, 2015.
Afsahi, Ali et al., A Low-Power Single-Weight-Combiner 802.11 abg SoC in 0.13 µm CMOS for Embedded Applications Utilizing an Area and Power Efficient Cartesian Phase Shifter and Mixer Circuit, IEEE Journal of Solid-State Circuits, vol. 43, No. 5, May 2008.
Bandodkar, J. A. et al., Non-Invasive Wearable Electrochemical Sensors: A Review, Trends in in Biotechnology, Jul. 2014, vol. 32, No. 7, p. 363-371.
Ben-Jabeur, T. et al., Enhancing Passive UHF RFID Backscatter Energy Using Chirp Spread Spectrum Signals and Channel Shortening, IEEE Wireless Conference and Networking Conference, Apr. 2016.
Berni, J. A. et al., On the Utility of Chirp Modulation for Digital Signaling, IEEE Transactions on Communications, 21 (6): 748-751, Jun. 1973.
Bharadia, Dinesh et al., Backfi: High Throughput Wifi Backscatter, SigComm, Aug. 2015, p. 283-296.
Bourzac, Katherine , Graphene Temporary Tattoo Tracks Vital Signs, https://spectrum.ieee.org/nanoclast/semiconductors/nanotechnology/graphene-temporary-tattoo, IEEE Spetrum's Nanotechnology Blog, Jan. 11, 2017, 2 pages.
Brandl, Martin et al., Long Range RFID Position Estimation for Applications in the Health Care System, IEEE 16th International Conference on e-Health Networking, Applications and Services (Healthcom), Oct. 2014, 2 pages.
Chawla, Vipul et al., An Overview of Passive RFID, IEEE Applications & Practice, Sep. 2007.
Chen, Tzung-Ming et al., A Low-Power Fullband 802.11a/b/g WLAN Transceiver With On-Chip PA, IEEE Journal of Solid-State Circuits vol. 42, No. 2, Feb. 2007.
Clarke, Ruthbea , Smart Cities and the Internet of Everything: The Foundation for Delivering Next-Generation Citizen Services, https://www.cisco.com/c/dam/en_us/solutions/industries/docs/scc/ioe_citizen_svcs_white_paper_idc_2013.pdf, IDC Government Insights, Oct. 2013.
Dayhoff, Steven , New Policies for Part 15 Devices, Federal Communications Commission Office of Engineering and Technology Laboratory Division TCBC Workshop, https://transition.fcc.gov/oet/ea/presentations/files/may05/New_Policies_Pt._15_SD.pdf, May 2005, 13 pages.
Ensworth, Joshua F. et al., Every Smart Phone Is a Backscatter Reader: Modulated Backscatter Compatibility With Bluetooth 4.0 Low Energy (BLE) Devices, IEEE International Conference on RFID, Apr. 2015.
Hambeck, Christian et al., A 2,4µW Wake-Up Receiver for Wireless Sensor Nodes With -71 dBm Sensitivity, 2015 IEEE Topical Conference on Wireless Sensors and Sensor Networks (WiSNet), Jan. 2015, pp. 534-537.
He, Dr. Xiaoxi , Flexible, Printed and Thin Film Batteries 2019-2029, http://www.idtechex.com/en/research-report/flexible-printed-and-thin-film-batteries-2019-2029/634, Sep. 2018, 16 pages.
Hu, Pan et al., Laissez-Faire: Fully Asymmetric Backscatter Communication, SIGCOMM, Aug. 2015, pp. 255-267.

(56) References Cited

OTHER PUBLICATIONS

Iyer, Vikram et al., Inter-Technology Backscatter: Towards Internet Connectivity for Inmplanted Devices, SIGCOMM, Aug. 2016.
Jeremy, Gummeson et al., FLIT: A Bulk Transmission Protocol for RFID-Scale Sensors, 10th International Conference on Mobile Systems, Applications, and Services, MobiSys '12, Jun. 2012, pp. 71-83.
Kimionis, John, Bistatic Scatter Radio for Increased-Range Environmental Sensing, Technical University of Crete, a Thesis Submitted in Partial Fulfillment of the Requirements for the Master of Science of Electronic and Computer Engineering, Aug. 2013.
Lakdawala, Hasnain et al., A 32nm SoC With Dual Core Atom Processor and RF Wifi Transceiver, IEEE Journal of Solid-State Circuits, vol. 48, No. 1, Jan. 2013.
Lee, Chungyeol P. et al., A Multistandard, Multiband SOC With Integrated BT, FM, WLAN Radios and Integrated Power Amplifier, IEEE International Solid-State Circuits Conference, Feb. 2010.
Liao, Yu-Te et al., A 3-µW CMOS Glucose Sensor for Wireless Contact-Lens Tear Glucose Monitoring, IEEE Journal of Solid-State Circuits, vol. 47, No, 1, Jan. 2012.
Lingzhi, Fu et al., Collision Recovery Receiver for EPC GEN2 RFID Systems, IEEE International Conference on the Internet of things (IOT) Oct. 2012.
Liu, Vincent et al., Ambient Backscatter: Wireless Communication Out of Thin Air, SIGCOMM, Aug. 2013.
Lohr, Steve, The Internet of Things and the Future of Farming, The New York Times, http://bits.blogs.nytimes.com/2015/08/03/the-internet-of-things-and-the-future-of-farming/?_r=0; Aug. 3, 2015, 6 pages.
Mahdavifar, et al., Coding for Tag Collision Recovery, IEEE International Conference on RFID, Apr. 2015, 8 pages.
Malim, George, How IOT Is Expanding Into Cosmetics and Medical Industries, http://www.iotglobalnetwork.com/iotdir/2016/03/22/how-iot-is-expanding-into-cosmetics-and-medical-industries-1203/, IoT Global Network, Mar. 22, 2016, 4 pages.
Morra, James, IOT Devices and Wearables Push Development of Thin, Flexible Batteries, http://electronicdesign.com/power/iot-devices-and-wearables-push-development-thin-flexible-batteries, ElectronicDesign, Sep. 18, 2015, 4 pages.
Nakamoto, et al., A Passive UHF RF Identification CMOS Tag IC Using Ferroelectric RAM in 0.35-µM Technology, IEEE Journal of Solid-State Circuits, vol. 42, No. 1, Jan. 2007.
Nathawad, et al., An IEEE 802.11a/b/g SoC for Embedded WLAN Applications, IEEE International Solid-State Circuits Conference, Feb. 2006, 10 pages.
Ou, et al., Come and Be Served: Parallel Decoding for Cots RFID Tags, MobiCom'15, Sep. 2015, 12 pages.
Pandey, et al., A Fully Integrated Re-Powered Contact Lens With a Single Element Display, IEEE Transactions on Biomedical Circuits and Systems, vol. 4, No. 6, Dec. 2010.
Pantelopoulos, et al., A Survey on Wearable Sensor-Based Systems for Health Monitoring and Prognosis, IEEE Transactions on Systems, Man, and Cybernetics—Part C: Applications and Reviews, vol. 40, No. 1, Jan. 2010.
Perez-Penichet, et al., Augmenting IoT Networks With Backscatter-Enabled Passive Sensor Tags, HotWireless'16, Oct. 2016, 5 pages.
Roberts, et al., A 98nW Wake-Up Radio for Wireless Body Area Networks, IEEE Radio Frequency Integrated Circuits Symposium, Jun. 2012, 4 pages.
Ru, et al., A Discrete-Time Mixing Receiver Architecture With Wideband Harmonic Rejection, IEEE International Solid-State Circuits Conference, Feb. 2008, 3 pages.
Sakurai, et al., A 1.5GHZ-Modulation-Range 10MS-Modulation-Period 180KHZRMS-Frequency-Error 26MHZ-Reference Mixed-Mode FMCW Synthesizer for MM-Wave Radar Application, IEEE International Solid-State Circuits Conference, Feb. 2011, 3 pages.
Sample, et al., Design of an RFID-Based Battery-Free Programmable Sensing Platform, IEEE Transactions on Instrumentation and Measurement, vol. 57, No. 11, Nov. 2008.
Smiley, Suzanne, Active RFID vs. Passive RFID: What's the Difference?, https://blog.atlasrfidstore.com/active-rfid-vs-passive-rfid, RFID Insider, Mar. 2016, 26 pages.
Talla, et al., Powering the Next Billion Devices With Wi-Fi, CoNEXT, Dec. 2015, 13 pages.
Thomas, et al., A 96 MBIT/SEC, 15.5 PJ/BIT 16-QAM Modulator for UHF Backscatter Communication, IEEE International Conference on RFID, Apr. 2012, 6 pages.
Varshney, et al,, Lorea: A Backscatter Reader for Everyone!, arXiv.org, Nov. 2016, 15 pages.
Vougioukas, et al., Could Battery-Less Scatter Radio Tags Achieve 270-Meter Range?, IEEE, May 2016, 3 pages.
Wei, et al., High-Efficiency Differential RF Front-End for a GEN2 RFID Tag, IEEE Transactions on Circuits and Systems—II: Express Briefs, vol. 58, No. 4, Apr. 2011, 6 pages.
Weldon, et al., A 1.75-GHz Highly Integrated Narrow-Band CMOS Transmitter With Harmonic-Rejection Mixers, IEEE Journal of Solid-State Circuits, vol. 36, No. 12, Dec. 2001.
Wu, et al., A 56.4-to-63.4 GHz Multi-Rate All-Digital Fractional-N PLL for FMCW Radar Applications in 65 NM CMOS, IEEE Journal of Solid-State Circuits, vol. 49, No. 5, May 2014.
Yao, et al., A Contact Lens With Integrated Telecommunication Circuit and Sensors for Wireless and Continuous Tear Glucose Monitoring, Journal of Micromechanics and Microengineering, Jun. 2012, 10 pages.
Yeager, et al., A 9 µA, Addressable GEN2 Sensor Tag for Biosignal Acquisition, IEEE Journal of Solid-State Circuits, vol. 45, No. 10, Oct. 2010, 12 pages.
Yin, et al., A System-on-Chip EPC GEN-2 Passive UHF RFID Tag With Embedded Temperature Sensor, IEEE Journal of Solid-State Circuits, vol. 45, No. 11, Nov. 2010, 17 pages.
Zhang, et al., Enabling Bit-By-Bit Backscatter Communication in Severe Energy Harvesting Environments, Proceedings of the 11th USENIX Symposium on Networked Systems Design and Implementation, Apr. 2014, 14 pages.
Zhang, et al., Enabling Practical Backscatter Communication for On-Body Sensors, SIGCOMM, Aug. 2016, 14 pages.
Zhang, et al., Hitchhike: Practical Backscatter Using Commodity Wifi, SenSys, Nov. 2016, 13 pages.
Zheng, et al., Read Bulk Data From Computational RFIDS, IEEE/ACM Transactions on Networking, vol. 24, No. 5, Oct. 2016.
U.S. Appl. No. 16/343,088 titled "Backscatter Systems, Devices, and Techniques Utilizing CSS Modulation and/or Higher Order Harmonic Cancellation" filed Apr. 18, 2019.
Kellogg, et al., "Wi-Fi Backscatter: Internet Connectivity for RF-Powered Devices", University of Washington, SIGCOMM'14, Aug. 17-22, 2014.
Extended European Search Report for EP Application No. 16836008.9 dated Feb. 12, 2019.
PCT Application No. PCT/US2018/026545 titled 'Image and/or Video Transmission Using Backscatter Devices' filed on Apr. 6, 2018.
U.S. Appl. No. 15/958,880 titled 'Apparatuses, Systems, and Methods for Communicating Using MIMO and Spread Spectrum Coding in Backscatter of Ambient Signals' filed on Apr. 20, 2018.
Murray Associates, "The Great Seal Bug Part 1", Murray Associates, Mar. 2017.
Zhang, et al., "EkhoNet: High Speed Ultra Low-power Backscatter for Next Generation Sensors", School of Computer Science, University of Massachusetts, Amherst, MA 01003, Sep. 2014.
Analog devices—rf/if circuits, http://www.analog.com/library/analogDialogue/archives/43-09/EDC%204%20rf%20if.pdf, Jan. 2007.
U.S. Appl. No. 15/923,238 titled "Radio Frequency Communication Devices Having Backscatter and Non-Backscatter Communication Modes and Hardware Re-Use" filed Mar. 16, 2018.
U.S. Appl. No. 16/119,055 titled "Devices and Methods for Backscatter Communication Using One or More Wireless Communication Protocols Including Bluetooth Low Energy Examples" filed Aug. 31, 2018.
Andrews, et al., A Passive Mixer-First Receiver With Digitally Controlled and Widely Tunable RF Interface, IEEE Journal of Solid-State Circuits, vol. 45, No. 12, Dec. 2010, p. 2696-2708.

(56) References Cited

OTHER PUBLICATIONS

Kellogg, et al., Passive Wi-Fi: Bringing Low Power to Wi-Fi Transmissions, Proceedings of the 13th USENIX Symposium on Networked Systems Design and Implementation, Mar. 2016, 15 pages.
Marki, et al., Mixer Basics Primer: A Tutorial for RF & Microwave Mixers, Marki Microwave, Inc., 2010, 12 pages.
Talla, et al., Hybrid Analog-Digital Backscatter: A New Approach for Battery-Free Sensing, IEEE International Conference on RFID, May 2013, 8 pages.
Cadence, "Cadence Spectre RF Option", http://www.cadence.com/products/rf/spectre_rf_simulation/pages/default.aspx. (Retrieved Jul. 19, 2018).
DigiPoints. DigiPoints Series vol. 1 Leader Guide Module 9—Network Architectures. Sep. 18, 2015, pp. 9.i-9.18.
IEEE, "IEEE Standard for Ethernet", http://standards.ieee.org/getieee802/download/802.11-2012.pdf., Dec. 28, 2012.
Maxim Integrated, "2.4GHz to 2.5GHz 802.11 g/b FR Transceiver, PA, and Rx/Tx/Antenna Diversity Switch", https://datasheets.maximintegrated.com/en/ds/MAX2830.pdf, (Retrieved Jul. 19, 2018).
NASA, "A Wi-Fi Reflector Chip to Speed Up Wearables", http://www.jpl.nasa.gov/news/news.php?feature=4663, Jul. 22, 2015.
Qualcomm, "AR9462 Single-chip, 2.4/5GHz, 2-stream 802.11a/b/g/n and BT 4.0 + HS SoC Solution with SST Technology", http://www.qca.qualcomm.com/wp-content/uploads/2013/11/AR9462.pdf. (Retrieved Jul. 19, 2018).
Qualcomm. "QCA4002/4004 Qualcomm low-power Wi-Fi", http://www.eeworld.com.cn/zt/wireless/downloads/QCA4002-4004FIN.pdf. (Retrieved Jul. 19, 2018).
Synopsys, "Concurrent Timing, Area, Power and Test Optimization", http://www.synopsys.com/Tools/Implementation/RTLSynthesis/DesignCompiler/Pages/default.aspx. (Retrieved Jul. 19, 2018).
U.S. Appl. No. 16/072,858, titled "Backscatter Devices Including Examples of Single Sideband Operations", filed Jul. 25, 2018.
"Altera de1 fpga development board", http://www.terasic.com.tw/cgi-bin/page/archive.pl?No=83,(Retrieved Jul. 19, 2018).
"Analog Devices HMC190BMS8/190BMS8E", https://www.hittite.com/content/documents/data_sheet/hmc190bms8.pdf. (Retrieved Jul. 19, 2018).
"Nest Cam Indoor", https://nest.com/camera/meet-nest-cam/?dropcam=true. 2018. (Retrieved Jul. 19, 2018).
Bharadia, et al., "Backfi: High Throughput WiFi Backscatter". In Proceedings of the 2015 ACM Conference on Special Interest Group on Data Communication, Aug. 2015.
Chen, et al., "Pulse-Modulation Imaging—Review and Performance Analysis", IEEE Transactions on Biomedical Circuits and Systems, vol. 5, No. 1, Feb. 2011, at 64.
Chokshi, et al., "Yes! Wi-Fi and Bluetooth Can Coexist in Handheld Devices", Emerging and Embedded Business Unit, Marvell Semiconductor, Inc., Mar. 2010.
Ensworth, et al., "Every smart phone is a backscatter reader: Modulated backscatter compatibility with bluetooth 4.0 low energy (ble) devices". 2015 IEEE International Conference on RFID. (Retrieved Jul. 19, 2018).
Greene, et al., "Intel's Tiny Wi-Fi Chip Could Have a Big Impact". MIT Technology review, Sep. 21, 2012.
Javed, et al., Background Subtraction via Superpixel-Based Online Matrix Decomposition With Structured Foreground Constraints, ICCVW '15 Proceedings of the 2015 IEEE International Conference on Computer Vision Workshop, Dec. 2015.
Kellogg, et al., "Wi-fi backscatter: Internet connectivity for rf-powered devices". In Proceedings of the 2014 ACM Conference on SIGCOMM, Aug. 2014.
Khannur, et al., "A Universal UHF RFID reader IC in 0.18-μm CMOS Technology". Solid-State Circuits, IEEE Journal of, 43(5):1146-1155, May 2008.
Lu, et al., "Enfold: Downclocking OFDM in WiFi". In Proceedings of the 20th annual international conference on Mobile computing and networking, pp. 129-140. ACM, Sep. 2014.
Lu, et al., "Slomo: Downclocking WiFi Communication". In NSDI, pp. 255-258, Apr. 2013.
Manweiler, et al., "Avoiding the Rush Hours: Wifi Energy Management via Traffic Isolation". In MobiSys, Jul. 2011.
Merritt, "Atheros targets cellphone with Wi-Fi chip", EE Times (Nov. 2, 2009), http://www.eetimes.com/document.asp?doc_id=1172134.
Mittal, et al., "Empowering developers to estimate app energy consumption". In MobiCom, Aug. 2012.
Naderiparizi, et al., "Ultra-Low-Power Wireless Streaming Cameras"; arXiv:1707.08718v1, Jul. 27, 2017, Cornell University Library.
Navaneethan, et al., Security Enhancement of Frequency Hopping Spread Spectrum Based on Oqpsk Technique. IOSR Journal of Electronics and Communication Engineering, May 2016. 62.
Proakis, et al., "Digital communications". 2005. McGraw-Hill, New York. (Retrieved Jul. 19, 2018).
Rattner, et al., "Connecting the Future: It's a Wireless World", Sep. 2013.
Ying, et al., "A System Design for UHF RFID Reader". In Communication Technology, 2008. ICCT 2008. 11th IEEE International Conference on, pp. 301-304. IEEE, Nov. 2008.
Unpublished PCT Application No. PCT/US2017/057207, entitled, "Backscatter Systems, Devices, and Techniques Utilizing CSS Modulation and/or Higher Order Harmonic Cancellation," filed Oct. 18, 2017, pp. all.
"Advanced Television Systems Committee (ATSC) (Sep. 1995) "ATSC Digital Television Standard," ATSC Doc. A/53, 74 pages", Sep. 1995.
"Analog Devices (retrieved Apr. 2016) "ADG919 RF Switch Datasheet," available online at: http://www.datasheet-pdf.com/PDF/ADG919-Datasheet-AnalogDevices-140819", Apr. 2016.
"Analog Devices, Inc. (retrieved Jan. 2016) "ADG902 RF switch datasheet," available online at: http://www.analog.com/static/imported-files/data_sheets/adg901_902.pdf", Jan. 2016.
"Axcera.com (retrieved Jan. 2016) "8VSB vs. COFDM," available online at: http://www.axcera.com/downloads/technotes-whitepapers/technote_4.pdf", Jan. 2016.
"DiBEG (May 2014; retrieved Jan. 2016) "The Launching Country," available online at: http://www.dibeg.org/world/world.html", May 2014.
"E. Inc. (retrieved Apr. 2016) "Universal software radio peripheral," available online at: http://ettus.com", Apr. 2016.
"Encounternet (retrieved Jan. 2016) "The Encountemet Project," available online at: http://encounternet.net/", Jan. 2016.
"Federal Communications Commission (retrieved Jan. 2016) "41 dBu service contours around ASRN 1226015, FCC TV query database," available, online at: http://transition.fcc.gov/fcc-bin/tvq?list=0&facid=69571", Jan. 2016.
International Search Report and Written Opinion received for PCT Appl. No. PCT/US16/46899 dated Dec. 15, 2016.
"STMicroelectronics (Jul. 2012) "TS 881 Datasheet" 1 page", Jul. 2012.
Anthony,, Sebastian , ""Free energy harvesting from TV signals, to power a ubiquitous internet of things"", ExtremeTech, google search, Jul. 8, 2013, 8 pages, Jul. 8, 2013.
Bharadia, et al., ""Full duplex backscatter"", Proceedings of the 12th ACM Workshop on Hot Topics in Networks, Article No. 4, pp. 1-7, Nov. 2013.
Bharadia, et al., ""Full duplex radios"", Proceedings of the ACM SIGCOMM 2013 (SIGCOMM '13), pp. 375-386, Aug. 2013.
Bohorquez, et al., ""A 350μW CMOS MSK transmitter and 400μW OOK super-regenerative receiver for medical implant communications"", IEEE Journal of Solid-State Circuits, 44(4):1248-1259, Apr. 2009.
Buettner, "Backscatter Protocols and Energy-Effcient Computing for RF-Powered Devices", PhD Thesis, University of Washington, Seattle, WA, 144 pages, Retrieved Jan. 2016., 2012.
Buettner, et al., "Dewdrop: An energy-aware runtime for computational RFID", Proceedings of the 8th USENIX Conference on Networked Systems Design and Implementation (NSDI'11), pp. 197-210, Mar. 2011.

(56) References Cited

OTHER PUBLICATIONS

Buettner, et al., "RFID Sensor Networks with the Intel WISP", Proceedings of the 6th ACM Conference on Embedded Network Sensor Systems (SenSys '08), pp. 393-394, Nov. 2008.

Dayhoff, "New Policies for Part 15 Devices", Federal Communications Commission (FCC) Telecommunications Certification Body Council (TCBC) Workshop 2005, 13 pages, May 2005.

Dementyev, et al., "Wirelessly Powered Bistable Display Tags", ACM International Joint Conference on Pervasive and Ubiquitous Computing (UbiComp '13), pp. 383-386, Sep. 2013.

Dementyev, A. et al., "A Wearable UHF RFID-Based EEG System", 2013 IEEE International Conference on RFID (RFID), pp. 1-7, Apr.-May 2013.

Duarte, et al., "Full-duplex wireless communications using off-the-shelf radios: Feasibility and first results", 2010 Conference Record of the 44th Asilomar Conference on Signals, Systems and Computers (ASILOMAR), pp. 1558-1562, Nov. 2010.

Duarte, "Full-duplex Wireless: Design, Implementation and Characterization", Ph.D. thesis, Rice University, 70 pages, Apr. 2012.

Duc, et al., "Enhancing Security of EPCGlobal Gen-2 RFID against Traceability and Cloning", Auto-ID Labs Information and Communication University, Auto-ID Labs White Paper No. WP-SWNET-016, 11 pages, Retrieved Jan. 2016., 2006.

Elliott, "Average U.S. Home Now Receives a Record 118.6 TV Channels, According to Nielsen", availabel online at: http://www.nielsen.com/us/en/insights/pressroom/2008/average_u_s_home.html, Jun. 2008.

Gorlatova, et al., "Energy harvesting active networked tags (EnHANTs) for ubiquitous object networking", IEEE Wireless Communications, 17(6):18-25, Dec. 2010.

Guo, et al., "Virtual full-duplex wireless communication via rapid on-off-division duplex", 48th Annual Allerton Conference on Communication, Control, and Computing (Allerton), pp. 412-419, Sep.-Oct. 2010.

Jain, et al., "Practical, real-time, full duplex wireless", Proceedings of the 17th Annual International Conference on Mobile Computing and Networking (MobiCom'11), pp. 301-312, Sep. 2011.

Johnston, Scott, "Software Defined Radio Hardware Survey", Oct. 2011, 31 pgs.

Kellogg, et al., "Bringing gesture recognition to all devices", Proceedings of the 11th USENIX Conference on Network Systems Design and Implementation (NSDI'14), pp. 303-316, Apr. 2014.

Kim, et al., "Flush: a reliable bulk transport protocol for multihop wireless networks", Proceedings of the 5th International Conference on Embedded Networked Sensor Systems (SenSys '07), pp. 351-365, Nov. 2007.

Kleinrock, et al., "Packet Switching in Radio Channels: Part I—Carrier Sense Multiple-Access Modes and Their Throughput-Delay Characteristics", IEEE Transactions on Communications, 23(12)1400-1416, Dec. 1975.

Kodialam, et al., "Fast and reliable estimation schemes in RFID systems", Proceedings of the 12th Annual International Conference on Mobile Computing and Networking (MobiCom '06), pp. 322-333, Sep. 2006.

Koomey, JG et al., "Implications of Historical Trends in the Electrical Efficiency of Computing", IEEE Annals of the History of Computing, 33(3):46-54, Aug. 2011.

Kuester, et al., "Baseband Signals and Power in Load-Modulated Digital Backscatter," IEEE Antenna and Wireless Propagation Letter, vol. II, 2012, pp. 1374-1377, Nov. 2012.

Lazarus, "Remote, wireless, ambulatory monitoring of implantable pacemakers, cardioverter defibrillators, and cardiac resynchronization therapy systems: analysis of a worldwide database", Pacing and Clinical Electrophysilogy, 30(Suppl 1):S2-S12, Jan. 2007.

Liang, et al., "Surviving wi-fi interference in low power zigbee networks", Proceedings of the 8th ACM Conference on Embedded Networked Sensor Systems (SenSys '10), pp. 309-322, Nov. 2010.

Liu, et al., "Ambient Backscatter: Wireless Communication Out of Thin Air," University of Washington, no date, date retrieved Jan. 11, 2016, pp. 1-12.

Liu, et al., "Ambient Backscatter: Wireless Communication out of Thin Air" Proceedings of the Association for Computing Machinery (ACM) 2013 Conference on Special Interest Group on Data Communications (SIGCOMM), pp. 39-50, also in ACM SIGCOMM Communication Review, 43(4):39-50, Aug./Oct. 2013.

Liu, et al., "Digital Correlation Demodulator Design for RFID Reader Receiver", IEEE Wireless Communications and Networking Conference (WCNC 2007), pp. 1666-1670, Mar. 2007.

Liu, et al., "Enabling Instantaneous Feedback with Full-duplex Backscatter", Proceedings of the 20th Annual International Conference on Mobile Computing and Networking (MobiCom'14), pp. 67-78, Sep. 2014.

Mace, "Wave reflection and transmission in beam" Journal of Sound and Vibration, 97(2):237-246, Nov. 1984.

Mastrototaro, "The MiniMed Continuous Glucose Monitoring System", Diabetes Technology & Therapeutics, 2(Suppl 1):13-18, Dec. 2000.

Metcalfe, et al., "Ethernet: Distributed packet switching for local computer networks", Communications of the ACM, 19(7):395-404, Jul. 1976.

Mishra, et al., "Supporting continuous mobility through multi-rate wireless packetization", Proceedings of the 9th Workshop on Mobile Computing Systems and Applications (HotMobile '08), pp. 33-37, Feb. 2008.

Mutti, et al., "CDMA-based RFID Systems in Dense Scenarios: Concepts and Challenges". 2008 IEEE International Conference on RFID, pp. 215-222, Apr. 2008.

Nikitin, et al. "Passive tag-to-tag communication", 2012 IEEE International Conference on RFID (RFID), pp. 177-184, Apr. 2012.

Nikitin, et al., "Theory and measurement of backscattering from RFID tags", IEEE Antennas and Propagation Magazine, 48(6):212-218, Dec. 2006.

Obeid, et al. "Evaluation of spike-detection algorithms for a brain-machine interface application", IEEE Transactions on Biomedical Engineering, 51(6);905-911, Jun. 2004.

Occhiuzzi, et al., "Modeling, Design and Experimentation of Wearable RFID Sensor Tag", IEEE Transactions on Antennas and Propagation, 58(8):2490-2498, Aug. 2010.

Pandey; et al., "A Sub-100 µ W MICS/ISM Band Transmitter Based on Injection-Locking and Frequency Multiplication", IEEE Journal of Solid-State Circuits, 46(5):1049-1058, May 2011.

Parks, et al., "A wireless sensing platform utilizing ambient RF energy", 2013 IEEE Topical Conference on Biomedical Wireless Technologies, Networks, and Sensing Systems (BioWireleSS), pp. 154-156, Jan. 2013.

Parks, et al., "A Wireless Sensing Platform Utilizing Ambient RF Energy", 2013 IEEE Topical Conference on Wireless Sensors and Sensor Networks (WiSNet), pp, 127-129, Jan. 2013.

Parks, Aaron N. et al., "Turbocharging Ambient Backscatter Communication", SIGCOMM, Aug. 2014, 1-12.

Pillai, et al., "An Ultra-Low-Power Long Range Battery/Passive RFID Tag for UHF and Microwave Bands With a Current Consumption of 700 nA at 1.5 V", IEEE Transactions on Circuits and Systems I: Regular Papers, 54(7):1500-1512, Jul. 2007.

Qing, et al., "A folded dipole antenna for RFID", IEEE Antennas and Propagation Society International Symposium, 1:97-100, Jun. 2004.

Rabaey, et al., "PicoRadios for wireless sensor networks: the next challenge in ultra-low power design", 2002 IEEE International Solid-State Circuits Conference, Digest of Technical Papers (ISSCC), 1:200-201, Feb. 2002.

Ransford, et al., "Mementos: system support for long-running computation on RFID-scale devices", ACM SIGPLAN Notices—Proceedings of the 16th International Conference on Architecturla Support for Programming Languages and Operating Systems (ASPLOS '11), 46(3):159-170, Mar. 2011.

Rao, Kvs et al., "Antenna design for UHF RFID tags: a review and a practical application", IEEE Transactions on Antennas and Propagation, 53(12):3870-3876, Dec. 2005.

Roy, et al., "RFID: From Supply Chains to Sensor Nets", Proceedings of the IEEE, 98(9):1583-1592, Jul. 2010.

(56) References Cited

OTHER PUBLICATIONS

Sample, et al., "Design of an RFID-Based Battery-Free Programmable Sensing Platform", IEEE Transactions on Instrumentation and Measurement, 57(11):12608-2615, Nov. 2008.
Sample, et al., "Experimental results with two wireless power transfer systems", IEEE Radio and Wireless Symposium (RAWCON), pp. 16-18, Jan. 2009.
Seigneuret, et al., "Auto-tuning in passive UHF RFID tags", 2010 8th IEEE International NEWCAS Conference (NEWCAS), pp. 181-184, Jun. 2010.
Sen, et al., "CSMA/CN: Carrier sense multiple access with collision notification", Proceedings of the 16th Annual International Conference on Mobile Computing and Networking (MobiCom'10), pp. 25-36, Sep. 2010.
Smith, Jr et al., "A wirelessly-powered platform for sensing and computation", ACM International Joint Conference on Pervasive and Ubiquitous Computing (UbiComp 2006), 4206:495-506, Sep. 2006.
So, et al., "Multi-channel mac for ad hoc networks; handling multi-channel hidden terminals using a single transceiver", Proceedings of the 5th ACM International Symposium on Mobile Ad Hoc Networking and Computing, pp. 222-233, May 2004.
Srinivasan, et al., "An empirical study of low-power wireless", ACM Transactions on Sensor Networks (TOSN), vol. 6, Issue 2, Article No. 16, Feb. 2010.
Thomas, et al., "A 96 Mbit/sec, 15.5 pJ/bit 16-QAM modulator for UHF backscatter communication", 2012 IEEE International Conference on RFID (RFID), IEEE RFID Virtual Journal, pp. 185-190, Apr. 2012.
Tubaishat, et al., "Sensor networks: an overview", IEEE Potentials, 22(2):20-23, Apr.-May 2003.
Walden, "Analog-to-digital converter survey and analysis", IEEE Journal on Selected Areas in Communications, 17(4):539-550, Apr. 1999.
Welbourne, et al., "Building the Internet of Things Using RFID: The RFID Ecosystem Experience", IEEE Internet Computing, 13(3):48-55, May-Jun. 2009.
Wuu, et al., "Zero-Collision RFID Tags Identification Based on CDMA", 5th International Conference on Information Assurance and Security (IAS '09), pp. 513-516, Aug. 2009.
Yi, et al., "Analysis and Design Strategy of UHF Micro-Power CMOS Rectifiers for Micro-Sensor and RFID Applications", IEEE Transactions on Circuits and Systems I: Regular Papers, 54(1):153-166, Jan. 2007.
Zalesky, et al., "Integrating segmented electronic paper displays into consumer electronic devices", 2011 IEEE International Conference on Consumer Electronics (ICCE), pp. 531-532, Jan. 2011.
Zhang, et al., "Frame retransmissions considered harmful: improving spectrum efficiency using micro-ACKs", Proceedings of the 18th Annual International Conference on Mobile Computing and Networking (MobiCom '12), pp. 89-100, Aug. 2012.
"6-dBi Gain Patch Antenna", https://www.arcantenna.com/index.php/product_ documents/get/document/id/492/, Accessed: Mar. 2017.
"A9 4K Ultra HD Camera SOC", http://www.ambarella.com/uploads/docs /A9-product-brief.pdf, Apr. 2020.
"ADG919 RF Switch", Analog Devices, http://www.analog.com/media/en/ technical-documentation/data-sheets/ADG918_919.pdf, Accessed Mar. 2017.
"Alexa—Top Sites in the United States", http://www.alexa.com/topsites/countries/US. Loaded Jan. 13, 2015.
"Barker Code", http://mathworld.wolfram.com/BarkerCode.html, Accessed Sep. 2017.
"BQ25570 Nano Power Boost Charger and Buck Converter for Energy Harvester Powered Applications", Texas Instruments, http://www.ti.com/lit/ds/symlink/bq25570.pdf, revised Mar. 2019, 1-45.
"Centeye Stonyman Image Sensor Datasheet", http://www.centeye.com/products/ current-centeye-vision-chips/, Accessed Mar. 2017.
"Chip Inductors—0402 HP Series (1005)", Coilcraft, http://www.coilcraft.com/pdfs/0402hp.pdf, revised Oct. 3, 2018.

"Cota: Real Wireless Power", Cota by Ossia, http://www.ossianic.com/, Apr. 2020.
"Digipoints Series vol. 1 Leader Guide Module 9—Network Architectures", http://www.scte.org/SCTE/Resources/DigiPoints_Volume_1.aspx, Accessed Jun. 17, 2018, 8.12, 8.15, last bullet point.
"Elisa-3 Robot", http://www.gctronic.com/ doc/index.php/Elisa-3 Accessed Mar. 2017.
"Grey Scale Ramp", https://jackelworthyproject.files.wordpress.com/2015/01/greyscaleramp.png, Dec. 11, 2019.
"Head Jack Pluggable RFID Reader for Smartphones", http://www.rfidtagworld.com/product s/Ear-Jack-reader-UHF_1056.html, Apr. 2020.
"Igloo Nano Low Power Flash FPGAS With Flash Freeze Technology", . https://www.microsemi.com/documentportal/doc_view/130695-ds0110-igloonano-low-power-flash-fpgasdatasheet, accessed Mar. 2017.
"LMV7219 Comparator", http://www.ti.com/lit/ds/symlink/lmv7219.pdfl, accessed Sep. 2017.
"NCX2200I Low Power Comparator Datasheet", http://www.nxp.com/documents/data_ sheet/NCX2200.pdf, Accessed Mar. 2017.
"Phantomjs—Scriptable Headless Browser", http://phantomjs.org/, loaded Jan. 14, 2015.
"RF5110 Amplifier", http://www.rfmd.com/store/downloads/dl/file/id/30508/ 5110g_product_data_sheet.pdf, Accessed Mar. 2017.
"Ring Video Doorbell", https://ring.com/, Accessed Mar. 2017.
"S-882Z Series: Ultra-Low Volatage Operation Charge Pump IC for Step-Up DC-DC Converter Startup", Seiko Instruments Inc, http://www.eetchina.com/ARTICLES/2006MAY/PDF/S882Z_E.pdf, Apr. 2020.
"SIT8021A1 Oscillator Datasheet", https://www.sitime.com/products/ datasheets/sit8021/SiT8021-datasheet.pdf, Accessed Mar. 2017.
"SMS7630-061: Surface-Mount, 0201 Zero Bias Silicon Schottky Detector Diode", Skyworks, http://www.skyworksinc.com/uploads/documents/SMS7630_061_201295G.pdf, Jul. 26, 2019.
"Synopsys Design Complier", http://www.synopsys.com/Tools/Implementation/RTLSynthesis/ DesignCompiler/Pages/default.aspx, Jan. 13, 2018.
"USRP X-300", https://www.ettus.com/ product/details/X300-KIT, Accessed Mar. 2017.
"Wattup—Wireless Charging 2.0", Energous Overview, http://www.energous.com/overview/, Apr. 2020.
"WISP 5 Platform", http: //wisp5.wikispaces.com/WISP+Home, Accessed Mar. 2017.
Bary, Emily, "Snapchat Spectacles Review: The Good, the Bad, the Revolutionary", http://www.barrons.com/articles/snapchat-spectacles-review-the-good-the-bad-the-revolutionary-1487846715, dated Dec. 12, 2019.
Beard, Randall H. et al., "Using Wearable Video Technology to Build a Point-of-View Surgical Education Library", JAMA Surgery, vol. 151, No. 8, Aug. 2016, 771-772.
Best, S.R. et al., "A Tutorial on the Receiving and Scattering Properties of Antennas", IEEE Antennas and Propagation Magazine, vol. 51, Issue 5, Oct. 2009, 26-37.
Chen, Guangyin D. et al., "Pulse-Modulation Imaging—Review and Performance Analysis", IEEE Transactions on Biomedical Circuits and Systems, vol. 5, No. 1, Feb. 2011, 64-82.
Chen, Long et al., "A 0.7-V 0.6-µW 100-kS/s Low-Power SAR ADC With Statistical Estimation-Based Noise Reduction", IEEE Journal of Solid-State Circuits, vol. 52, Issue 5, May 2017, 1388-1398.
Consortium, W.P. , "QI Wireless Power Specification", Introduction to the Power Class 0 Specification, Version 1.2.3, Feb. 2017.
Covic, Grant A. et al., "Inductive Power Transfer", Proceedings of the IEEE, vol. 101, No. 6, Jun. 2013, 1276-1289.
Curty, J.-P. et al., "Remotely Powered Addressable UHF RFID Integrated System", IEEE Journal of Solid-State Circuits, vol. 40, No. 11, Nov. 2005.
Ensworth, Joshua F. et al., "Waveform-Aware Ambient RF Energy Harvesting", IEEE International Conference on RFID, Apr. 8-10, 2014, 67-73.

(56) References Cited

OTHER PUBLICATIONS

Fuller, S.B. et al., "Controlling Free Flight of a Robotic Fly Using an Onboard Vision Sensor Inspired by Insect Ocelli", Journal of the Royal Society Interface, 11(97):20140281, received Mar. 17, 2014.
Gollakota, Shyamnath et al., "Secure In-Band Wireless Pairing", Proceedings of the 20th USENIX Conference on Security, Aug. 2011, 16 pages.
Gudan, Kenneth et al., "Ultra-Low Power 2.4GHz RF Energy Harvesting and Storage System With -25dBm Sensitivity", IEEE International Conference on RFID, Apr. 15-17, 2015.
Hagerty, Joseph A. et al., "Recycling Ambient Microwave Energy With Broad-Band Rectenna Arrays", IEEE Transactions on Microwave Theory and Techniques, vol. 52, No. 3, Mar. 2004.
Hanson, S. et al., "A 0.5 V Sub-Microwatt CMOS Image Sensor With Pulse-Width Modulation Read-Out", IEEE Journal of Solid-State Circuits, vol. 45, Issue 4, Mar. 2010, 759-767.
Hawkes, Allen M. et al., "A Microwave Metamaterial With Integrated Power Harvesting Functionality", Applied Physics Letters 103, 163901, Oct. 2013.
Jadidian, Jouya et al., "Magnetic MIMO: How to Charge Your Phone in Your Pocket", MobiCom, The 20th Annual International conference on Mobile Computing and Networking, Sep. 7-11, 2014.
Javed, Sajid et al., "Background Subtraction via Superpixel-Based Online Matrix Decomposition With Structured Foreground Constraints", ICCV'15 Proceedings of the 2015 IEEE International Conference on Computer Vision Workshop (ICCVW), Dec. 2015, DOI: 10.1109/ICCVW.2015.123, p. 1, Second Column, Third Paragraph.
Kapucu, Kerem et al., "A Passive UHF RFID System With a Low-Power Capacitive Sensor Interface", 2014 IEEE RFID Technology and Applications Conference (RFID-TA), Sep. 8-9, 2014, 301-305.
Kawahara, Yoshihiro et al., "Power Harvesting From Microwave Oven Electromagnetic Leakage", UbiComp '13, Session: Hardware, Sep. 8-12, 2013, Zurich, Switzerland, 373-381.
Kawahara, Yoshihiro et al., "Sensprout: Inkjet-Printed Soil Moisture and Leaf Wetness Sensor", UbiComp '12, Sep. 5-8, 2012, Pittsburgh, USA, 545.
Kellogg, Bryce et al., "Bringing Gesture Recognition to All Devices", Proceedings of the 11th USENIX Symposium on Networked Systems Design and Implementation (NSDIm'14), Apr. 2-4, 2014, Seattle,WA, USA, 303-316.
Kellogg, Bryce et al., "Wi-Fi Backscatter: Internet Connectivity for RF-Powered Devices", SIGCOMM '14, Aug. 17-22, 2014, Chicago, IL., USA.
Kester, Walt "Understand Sinad, ENOB, SNR, THD, THD + N SFDR So You Don't Get Lost in the Noise Floor", MT-003 Tutorial, https://www.analog.com/media/en/training-seminars/tutorials/MT-003.pdf, Jan. 2009.
Kurs, André et al., "Wireless Power Transfer via Strongly Coupled Magnetic Resonances", Science Magazine, vol. 317, Jul. 6, 2007, 83-86.
Leñreo-Bardallo, Juan A. et al., "A 3.6 µs Latency Asynchronous Frame-Free Event-Driven Dynamic-Vision-Sensor", IEEE Journal of Solid-State Circuits, vol. 46, No. 6, Jun. 2011, 1443-1455.
Likamwa, Robert et al., "Energy Characterization and Optimization of Image Sensing Toward Continuous Mobile Vision", Proceedings from the 11th Annual International Conference on Mobile Systems, Applications, and Services, Jun. 2013, 69-82.
Liu, Vincent et al., "Ambient Backscatter: Wireless Communication Out of Thin Air", SIGCOMM '13, Aug. 12-16, 2013, Hong Kong, China, 39-50.
Low, Zhen N. et al., "Design and Test of a High-Power High-Efficiency Loosely Coupled Planar Wireless Power Transfer System", IEEE Transactions on Industrial Electronics, vol. 56, No. 5, May 2009, 1801-1812.
Magno, Michele et al., "Adaptive Power Control for Solar Harvesting Multimodal Wireless Smart Camera", 2009 Third ACM/IEEE International Conference on Distributed Smart Cameras (ICDSC), Aug. 30-Sep. 2, 2009.

Mallik, Udayan et al., "Temporal Change Threshold Detection Imager", 2005 IEEE International Solid-State Circuits Conference (ISSCC 2005), Feb. 8, 2005, 362-363, 603.
Michel, Fridolin et al., "A 250mV 7.5µW 61dB SNDR CMOS SC $\Delta\Sigma$ Modulator Using a Near-Threshold-Voltage-Biased CMOS Inverter Technique", 2011 IEEE International Solid-State Circuits Conference, Session 27, Feb. 20-24, 2011, 476-478.
Moore, Stephen, "Moving Camera on a Motorcycle Video Clip", YouTube, https:/www.youtube.com/watch?v=sHj3xSG-R_E &t=376s, Uploaded Apr. 22, 2015.
Murmann, B., "ADC Performance Survey 1997-2019", http://web.stanford.edu/~murmann/adcsu rvey.html, dated Dec. 12, 2019.
Naderiparizi, S. et al., "Glimpse: A Programmable Early-Discard Camera Architecture for Continuous Mobile Vision", Proceedings from the 15th Annual International Conference on Mobile Systems, Applications, and Services, Jun. 19-23, 2017, 292-305.
Naderiparizi, S. et al., "Self-Localizing Battery-Free Cameras", Proceedings from 2015 ACM International Joint Conference on Pervasive and Ubiquitous Computing, Sep. 2015, 445-449.
Naderiparizi, S. et al., "WISPCAM: A Battery-Free RFID Camera", 2015 IEEE International Conference on RFID (RFID), Apr. 15-17, 2015.
Naderiparizi, S. et al., "WISPCAM: An RF-Powered Smart Camera for Machine Vision Applications", Proceedings from the 4th International Workshop on Energy Harvesting and Energy-Neutral Sensing Systems, Nov. 2016, 19-22.
Naderiparizi, Saman et al., "Battery-Free Connected Machine Vision With WISPCam", GetMobile, vol. 20, Issue 1, Jan. 2016, 10-13.
Naderiparizi, Saman et al., "Ultra-Low-Power Wireless Streaming Cameras", arXiv:1707.08718 [cs.ET] Jul. 27, 2017, Cornell University Library, Accessed Jun. 14, 2018.
Navaneethan, V.M., "Security Enhancement of Frequency Hopping Spread Spectrum Based on OQPSK Technique", IOSR Journal of Electronics and Communication Engineering, ICEICT 2016, e-ISSN: 2278-2834, p-ISSN: 2278-8735, abstract; p. 62, fourth and fifth paragraphs, p. 63, sixth paragraph; p. 67, second paragraph, 62-70.
Nayar, S.K. et al., "Towards Self-Powered Cameras", 2015 IEEE International Conference on Computational Photography (ICCP), Apr. 24-26, 2015, 1-10.
Nelson, G.M. et al., "Design and Simulation of a Cockroach-Like Hexapod Robot", Proceedings from the 1997 IEEE International Conference on Robotics and Automation, vol. 2, Apr. 25, 1997, 1106-1111.
Nikitin, P.V. et al., "Differential RCS of RFID Tag", Electronics Letters, vol. 43, Issue 8, Apr. 12, 2007.
Nikitin, P.V. et al., "Theory and Measurement of Backscattering From RFID Tags", IEEE Antennas and Propagation Magazine, vol. 48, Issue 6, Dec. 2006, 212-218.
Olgun, U. et al., "Design of an Efficient Ambient Wifi Energy Harvesting System", IET Microwaves, Antennas & Propagation, vol. 6, Iss. 11, Mar. 2012, 1200-1206.
Olgun, Ugur et al., "Efficient Ambient Wifi Energy Harvesting Technology and Its Applications", 2012 IEEE Antennas and Propagation Society International Symposium, Jul. 8-14, 2012.
Olgun, Ugur et al., "Wireless Power Harvesting With Planar Rectennas for 2.45 GHz RFIDs", 2010 URSI International Symposium on Electromagnetic Theory, Aug. 16-19, 2010, 3229-331.
Parks, Aaron N., "A Wireless Sensing Platform Utilizing Ambient RF Energy", 2013 IEEE Topical Conference on Biomedical Wireless Technologies, Networks, and Sensing Systems, Jan. 20-23, 2013.
Rubenstein, M. et al., "Programmable Self-Assembly in a Thousand-Robot Swarm", Science, vol. 345, Issue 6198, Aug. 2014, 795-799.
Sample, Alanson et al., "Experimental Results With Two Wireless Power Transfer Systems", Proceedings of the 4th international conference on Radio and Wireless Symposium, Jan. 2009.
Sample, Alanson P. et al., "Design of an RFID-Based Battery-Free Programmable Sensing Platform", IEEE Transactions on Instrumentation and Measurement, vol. 57, No. 11, Nov. 2008.
Sarpeshkar, Rahul, "Analog Versus Digital: Extrapolating From Electronics to Neurobiology", Neural Computation, vol. 10, Issue 7, Mar. 1998, 1601-1638.

(56) References Cited

OTHER PUBLICATIONS

Scott, Michael D. et al., "An Ultra-Low Power ADC for Distributed Sensor Networks", Proceedings of the 28th European Solid-State Circuits Conference, Oct. 2002, 255-258.
Shafik, R.A. et al., "On the Error Vector Magnitude as a Performance Metric and Comparative Analysis", 2006 International Conference on Emerging Technologies, Nov. 13-14, 2006, 27-31.
Souppouris, Aaron , "This Router Can Power Your Devices Wirelessly From 15 Feet Away", Energous Wattup Demo, Engadget, http://www.engadget.com/2015/01/05/ energous-wattup-wireless-charging-demo/, Jan. 5, 2015.
Swider, Matt , "Snapchat Spectacles (2016) Review", http://www.techradar.com/ reviews/snap-spectacles, Dec. 12, 2019.
Talla, Vamsi et al., "Battery-Free Cellphone", PACM Interact. Mob. Wearable Ubiquitous Technol. 1, 2, Article 25, Jun. 2017.
Talla, Vamsi et al., "Lora Backscatter: Enabling the Vision of Ubiquitous Connectivity", Proceedings of the ACM on Interactive, Mobile, Wearable and Ubiquitous Technologies, vol. 1, No. 3, Article 105, Sep. 2017, 105:1-105:24.
Talla, Vamsi et al., "Wi-Fi Energy Harvesting for Battery-Free Wearable Radio Platforms", IEEE International Conference on RFID, Apr. 15-17, 2015, 47-54.
Tang, Fang et al., "An 84 pW/Frame Per Pixel Current-Mode CMOS Image Sensor With Energy Harvesting Capability", IEEE Sensors Journal, vol. 12, No. 4, Apr. 2012, 720-726.
Trotter, Matthew S. et al., "Power-Optimized Waveforms for Improving the Range and Reliability of RFID Systems", 2009 IEEE International Conference on RFID, Apr. 27-28, 2009.
Trotter, Matthew S. , "Survey of Range Improvement of Commercial RFID Tags With Power Optimized Waveforms", IEEE RFID, Apr. 12-14, 2010, 195-202.
Valenta, Christopher R. et al., "Harvesting Wireless Power: Survey of Energy-Harvester Conversion Efficiency in Far-Field, Wireless Power Transfer Systems", IEEE Microwave Magazine, vol. 15, Issue 4, Jun. 2014, 108-120.
Vera, Gianfranco A. et al., "Design of a 2.45 GHz Rectenna for Electromagnetic (EM) Energy Scavenging", 2010 IEEE Radio and Wireless Symposium (RWS), Jan. 10-14, 2010, 61-64.
Visser, Hubregt J. et al., "Ambient RF Energy Scavenging: GSM and WLAN Power Density Measurements", Proceedings of the 38th European Microwave Conference, Oct. 27-31, 2008.
Wang, Anran et al., "FM Backscatter: Enabling Connected Cities and Smart Fabrics", NSDI'17, Proceedings of the 14th USENIX Conference on Networked Systems Design and Implementation, Mar. 2017, 243-258.
Waters, Benjamin H. et al., "Powering a Ventricular Assist Device (VAD) With the Free-Range Resonant Electrical Energy Delivery (Free-D) System", Proceedings of the IEEE, vol. 100, No. 1, Jan. 2012, 138-149.
Yehl, Kevin et al., "High-Speed DNA-Based Rolling Motors Powered by Rnase H", Nature Nanotechnology 11(2), Feb. 2016, 184-190.

\* cited by examiner

BACKSCATTER DEVICES AND NETWORK SYSTEMS INCORPORATING BACKSCATTER DEVICES

CROSS-REFERENCE TO RELATED APPLICATION(S)

This application is a 35 U.S.C. § 371 National Stage application of PCT Application No. PCT/US2016/046899, filed on Aug. 12, 2016, which claims the benefit under 35 U.S.C. § 119 of the earlier filing date of U.S. Provisional Application Ser. No. 62/204,382 filed Aug. 12, 2015, and U.S. Provisional Application Ser. No. 62/236,761 filed Oct. 2, 2015. The entire contents of the afore-mentioned applications are hereby incorporated by reference, in their entirety, for any purpose.

STATEMENT REGARDING FEDERALLY SPONSORED RESEARCH OR DEVELOPMENT

This invention was made with government support under grant CNS-1407583 awarded by the National Science Foundation and grant CNS-1452494 awarded by the National Science Foundation. The government has certain rights in the invention.

TECHNICAL FIELD

Examples described herein relate generally to wireless communication. Examples of backscatter devices and network systems incorporating backscatter devices are described.

BACKGROUND

Communication in accordance with wireless communication protocols (e.g. Wi-Fi, Bluetooth, Zigbee, SigFox) may drive the power budgets of sensors or other communicating devices. The power required for such communication may be prohibitive to fully implementing a variety of Internet of Things ("IoT"), or other ubiquitous sensing scenarios. While CMOS technology scaling has conventionally provided exponential benefits for the size and power consumption of digital logic systems, analog RF components, that are necessary for Wi-Fi communication, have not seen a similar power scaling. As a result, Wi-Pi transmissions on sensors and mobile devices still consume hundreds of milliwatts of power.

Backscattering techniques have been described that create an additional narrowband data stream to ride on top of existing Wi-Fi signals. However the devices are typically limited by low data rates at close by distances or requite the use of custom foil-duplex hardware at the receiver such that communications, could not be received by any existing Wi-Fi device.

SUMMARY

Examples of backscatter devices are described herein. In some examples, a backscatter device includes an antenna configured to backscatter a carrier signal having a first frequency, baseband circuitry configured to provide data for transmission, a waveform generator configured to provide a waveform having a second frequency, wherein the second frequency is a difference between the first frequency and a third frequency, a sub-carrier phase modulator coupled to the baseband circuitry and the waveform generator, the sub-carrier phase modulator configured to adjust a phase, amplitude, or combinations thereof, of the waveform in accordance with the data to provide an output signal, and a switch coupled to the antenna, the switch configured to control the antenna to backscatter the carrier signal in accordance with the output signal such that the first frequency is mixed with the second frequency to transmit the data in a backscatter signal at the third frequency.

In some examples, the backscatter signal is arranged in accordance with a wireless communication protocol implementing phase-shift keying, amplitude-shift keying, or combinations thereof. In some examples, the wireless communication protocol comprises ZigBee, SigFox, or combinations thereof.

In some examples, the waveform comprises a square wave, an analog signal, a multi-level signal, or combinations thereof.

In some examples, the data comprises a Wi-Fi packet.

In some examples, the switch is configured to control the antenna to backscatter the carrier signal in accordance with the output signal to transmit the data at the third frequency and a fourth frequency.

Some example backscatter devices may include multiple antennas, and the carrier signal may be provided using MIMO techniques.

In some examples, a backscatter device includes an antenna, the antenna configured to backscatter a frequency hopped signal including a first frequency, baseband circuitry configured to provide data for transmission, a waveform generator configured to provide a waveform having a second frequency and further configured to hop the second frequency in accordance with the frequency hopped signal, a sub-carrier phase modulator coupled to the baseband circuitry and the waveform generator, the sub-carrier phase modulator configured to adjust a phase, amplitude, or combinations thereof, of the waveform in accordance with the data to provide an output signal, and a switch coupled to the antenna, the switch configured to control the antenna to backscatter the carrier signal in accordance with the output signal such that the first frequency is mixed with the second frequency to transmit the data at a third frequency.

In some examples, the waveform comprises a square wave, analog signal, multi-level signal, or combinations thereof.

In some examples, the frequency hopped signal comprises a sequence of frequencies, and wherein the sequence of frequencies is received by the backscatter device over a downlink from a device configured to transmit the carrier signal.

In some examples, the frequency hopped signal comprises a sequence of frequencies, and wherein the backscatter device further comprises a memory configured to store the sequence of frequencies. In some examples, the sequence of frequencies comprises a pseudorandom sequence.

In some examples, the first frequency is mixed with the second frequency to transmit the data in a backscatter signal at the third frequency, and the backscatter signal comprises a signal in accordance with a wireless communication protocol selected from the group of protocols consisting of ZigBee, SigFox, and combinations thereof.

In some examples, backscatter devices may further include frequency determination circuitry coupled to the antenna, the frequency determination circuitry configured to provide an indication of the second frequency to the waveform generator at least in part by sensing the first frequency of the carrier signal and computing a difference between the first frequency and the third frequency.

In some examples, backscatter devices may thither include multiple antennas, and the carrier signal may be provided using MIMO techniques.

In some examples, a backscatter device includes an antenna, the antenna configured to backscatter a carrier signal having a first frequency, the carrier signal comprising a spread spectrum signal, baseband circuitry configured to provide data for transmission in accordance with the spread spectrum signal, a waveform generator configured to provide a waveform having a second frequency, a sub-carrier phase modulator coupled to the baseband circuitry and the waveform generator, the sub-carrier phase modulator configured to adjust a phase, amplitude, or combinations thereof, of the waveform in accordance with the data to provide an output signal, and a switch coupled to the antenna, the switch configured to control the antenna to backscatter the carrier signal in accordance with the output signal such that the first frequency is mixed with the second frequency to transmit the data at a third frequency.

In some examples, the first frequency is mixed with the second frequency to transmit the data in a backscatter signal at the third frequency, and the backscatter signal comprises a signal in accordance with a wireless communication protocol selected from the group of protocols consisting of Wi-Fi, ZigBee, SigFox, and combinations thereof.

In some examples, the data for transmission includes a spreading sequence.

In some examples, the sub-carrier phase modulator begins backscatter at a time based on features of the carrier signal.

In some examples, the sub-carrier phase modulator begins backscatter responsive to a synchronization signal from another device.

In some examples, backscatter devices further include multiple antennas, and the carrier signal may be provided using MIMO techniques.

Examples of methods are disclosed herein. An example method includes a method for controlling access to a first wireless communication channel. In some examples, the method may include transmitting a signaling packet from a first wireless communication device on at least the first wireless communication channel and a second wireless communication channel, wherein the signaling packet includes an identification of at least one backscatter device, and receiving the signaling packet at the at least one backscatter device, and responsive to receipt of the signaling packet, backscattering a carrier signal at least partially provided on the second wireless communication channel into a transmission on the first wireless communication channel.

In some examples, the method includes backscattering during a short interframe spacing (SIFS) time after receipt of the signaling packet.

In some examples, the method includes transmitting, from the at least one backscatter device to the first wireless communication device, an indication of a fixed data rate, maximum data rate, or combinations thereof.

In some examples, the method includes transmitting the signaling packet in accordance with the fixed data rate, maximum data rate, or combinations thereof.

In some examples, the fixed data rate, maximum data rate, or combinations thereof indicate a rate of data transfer from a sensor associated with the at least one backscatter device.

In some examples, the method includes performing carrier sense, by the first wireless communication device, on the first and second wireless communication channels, prior to transmitting the signaling packet.

In some examples, the method includes receiving, at a receiver, the transmission on the first wireless communication channel from the backwater device.

In some examples, the method includes transmitting, by the receiver, an acknowledge message, responsive to receipt of the transmission. In some examples, the method further includes receiving, at the first wireless communication device, the acknowledge message and transmitting a next signaling packet, by the first wireless communication device, including an indication of receipt of the acknowledge message.

In some examples, the transmitting includes using ON/OFF keying to provide the identification.

In some examples, the method includes computing, at the first wireless communication device, a fraction of successfully received transmissions, and encoding a bit rate in the signaling packet based on the fraction of successfully received transmissions.

In some examples, the method includes, responsive to lack of an acknowledge message from a receiver, transmitting by the first wireless communication device, a next signaling packet including an indication of lack of receipt of the acknowledge message.

In some examples, methods for associating a backscatter device with other devices in a network may be provided. In some examples, a Method includes associating a receiver with two physical addresses, broadcasting a discovery packet with the two physical addresses, receiving the discovery packet at a backscatter device and transmitting, by the backscatter device, a backscatter packet with source and destination addresses set to the two physical addresses, wherein the backscatter packet includes a payload including a third physical address of the backscatter device, receiving the backscatter packet at a helper device, and associating the backscatter device with the receiver, by the helper device, in part by spoofing the third physical address by the helper device.

In some examples, the two physical addresses are MAC addresses.

In some examples, the broadcasting comprises using amplitude modulation. In some examples, the broadcasting comprises using ON/OFF keying.

In some examples, the discovery packet includes a broadcast ID specific to the backscatter device.

In some examples, the payload further includes a sensor update rate, packet length, supported bit rates, or combinations thereof.

In some examples, the method includes transmitting, by the helper device an ID, and transmitting the ID to the backscatter device.

In some examples, the method includes, responsive to receipt of the ID at the backscatter device, transmitting, by the backscatter device, an acknowledgement packet with a source address set to the third physical address and a destination address set to at least one of the two physical addresses.

In some examples, the method includes sending credentials for the third physical address securely using a secret key shared between the backscatter device and the helper device.

In some examples, a backscatter device may include an antenna configured to backscatter a carrier signal having a first channel frequency of a first phase-shift keying protocol, a first amplitude-shift keying protocol, or combinations thereof, baseband circuitry configured to provide data for transmission, a waveform generator configured to preside a waveform having a second frequency, wherein the second frequency is a difference between the first channel frequency and a third channel frequency of a second phase-shift keying protocol, a second amplitude-shift keying protocol, or combinations thereof, a sub-carrier phase modulator coupled to the baseband circuitry and the waveform generator, the sub-carrier phase modulator configured to provide or suppress the waveform in accordance with the data to provide an output signal, and a switch coupled to the antenna, the switch configured to control the antenna to backscatter the carrier signal in accordance with the output signal such that the first channel frequency is mixed with the second frequency to transmit a backscatter signal at the third channel frequency.

In some examples, the first phase-shift keying protocol, the first amplitude-shift keying protocol, or the combinations thereof are a same phase-shill keying protocol, amplitude-shift keying protocol, or combinations thereof as the second phase-shift keying protocol, the second amplitude-shift keying protocol, or the combinations thereof.

In some examples, the first phase-shift keying protocol, the first amplitude-shift keying protocol, or the combinations thereof are a different phase-shift keying protocol, amplitude-shift keying protocol, or combinations thereof as the second phase-shift keying protocol, the second amplitude-shift keying protocol, or the combinations thereof.

In some examples, the first phase-shill keying protocol, the first amplitude-shift keying protocol, or the combinations thereof are selected from the group consisting of ZigBee, SigFox, and combinations thereof.

In some examples, the second phase-shift keying protocol, the first amplitude-shift keying protocol, or the combinations thereof are selected from the group consisting of Wi-Fi, ZigBee, SigFox, and combinations thereof.

In some examples, the first channel frequency comprises a first Wi-Fi channel frequency and the third channel frequency comprises a second Wi-Fi channel frequency.

In some examples, the backscatter device may include multiple antennas, and the carrier signal may be provided using MIMO techniques.

Examples of systems are described herein. In some examples, a system may include a helper device configured to transmit a carrier signal including a first frequency, a backscatter device configured to backscatter the carrier signal using sub-carrier modulation with a waveform having a second frequency, the backscatter device configured to backscatter the carrier signal into a backscatter signal at a third frequency, the third frequency equal to a combination of the first and second frequencies, and a receiver configured to receive the backscatter signal at the third frequency.

In some examples, the backscatter device may be further configured to provide data in the backscatter signal using phase shift keying, amplitude shift keying, or combinations thereof.

In some examples, the system may include a plurality of helper devices including the helper device and a plurality of receivers including the receiver, and the helper device may be selected from the plurality of helper devices to provide the carrier signal based, at least in part, on a proximity of the helper device to the backscatter device.

In some examples, each of the plurality of helper devices is configured to provide the carrier signal in one mode and to receive the backscatter signal in another mode.

In some examples, the helper device and the receiver are separate electronic devices.

In some examples, the helper device and the receiver are integrated in a same device, the same device including cancellation circuitry configured to cancel the carrier signal at the receiver.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known circuits, control signals, networking components, timing protocols, and software operations have not been shown in detail in order to avoid unnecessarily obscuring the described embodiments of the invention.

Examples described herein may provide backscatter devices and systems that may synthesize standard-compliant wireless transmissions (e.g. Wi-Fi and/or ZigBee) to communicate with standard compliant off the shelf devices such as Wi-Fi access points and/or ZigBee hubs. Sensors utilizing examples of the described backscatter technology may have orders of magnitude lower power consumption, which may drastically improve the battery life and/or reduce the size and cost of the battery on sensors.

Examples described herein include devices and systems utilizing backscatter communication to directly generate Wi-Fi transmissions (e.g. instead of sending an additional data stream by backscattering Wi-Fi signals) that can be decoded on any of the billions of existing devices with a Wi-Fi chipset. Examples include devices that generate 802.11b transmissions using backscatter communication, while consuming 4-5 orders of magnitude lower power in some examples than existing chipsets.

Examples of network stacks are described which may facilitate backscatter devices to coexist with other devices (e.g. in the ISM band), without incurring, or reducing a need for, the power consumption of carrier sense and medium access control operations.

Figure 1:
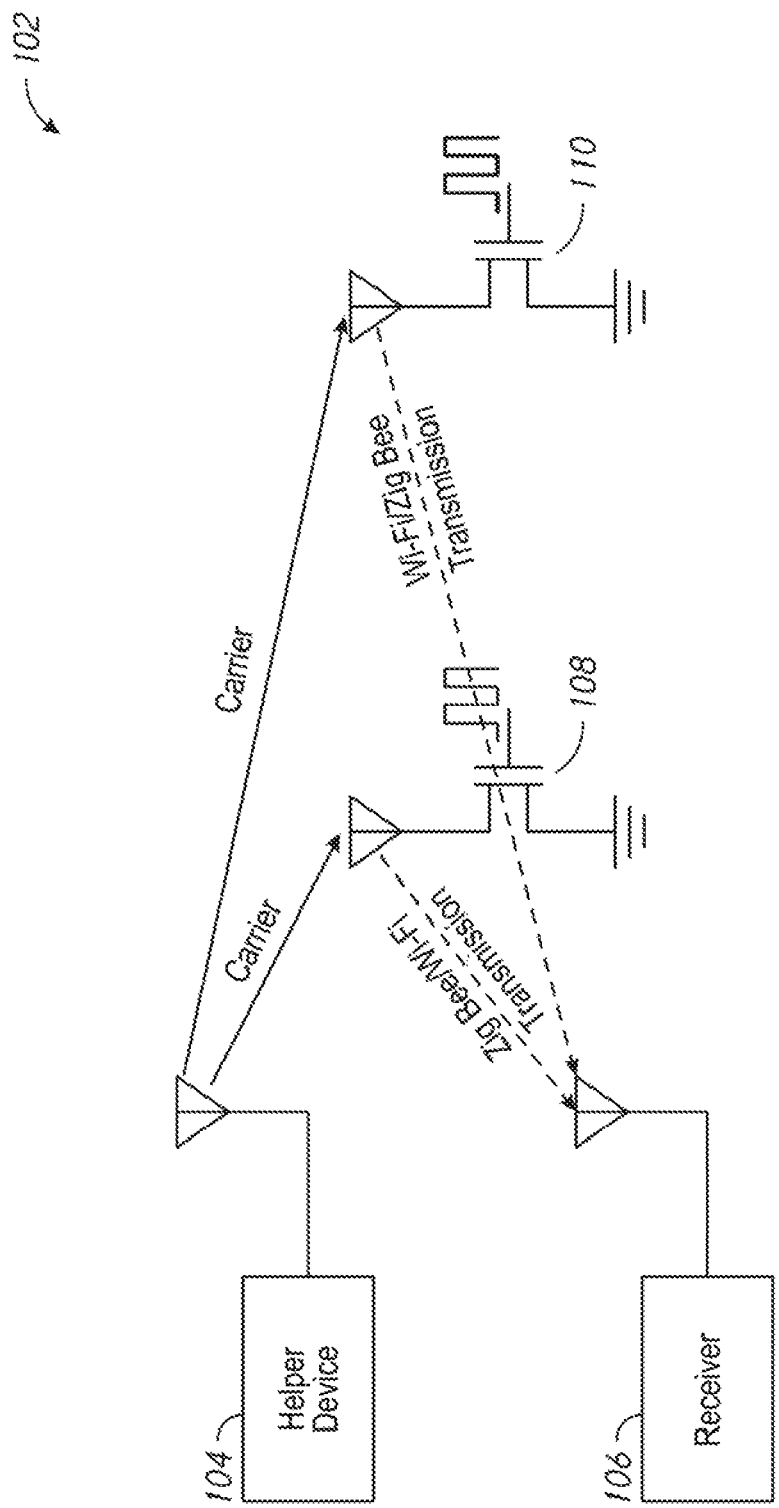
FIG. 1 is a schematic illustration of a system arranged in accordance with examples described herein.

FIG. 1 is a schematic illustration of a system arranged in accordance with examples described herein. The system 102 includes helper device 104, receiver 106, backscatter device 108, and backscatter device 110. During operation, the helper device 104 transmits a carrier signal. The backscatter device 108 and/or backscatter device 110 may backscatter the carrier signal into transmissions that may be compliant with a wireless communication protocol, such as Wi-Fi and/or ZigBee. The transmissions from the backscatter device 108 and/or backscatter device 110 may be received by the receiver 106. In this manner, the receiver 106 may be any electronic device that is capable of receiving a wireless communication signal (e.g. a wireless communication device) arranged in the protocol transmitted by the backscatter device 108 and/or backscatter device 110, e.g. Wi-Fi and/or ZigBee. Accordingly, backscatter devices may transmit to conventional electronic devices (e.g. wireless communication devices) using wireless communication protocols.

Wi-Fi signals generally refer to wireless local area network communication signals, typically using the 2.4 GHz and/or 5 GHz ISM radio bands. The communication signals may be sent in accordance with the Institute of Electrical and Electronics Engineers' 802.11 standards, such as but not limited to, 802.11a, 802.11b, 802.11g, and/or 802.11n.

The helper device 104 may be implemented using any electronic device capable of providing carrier signals (e.g. wireless communication device) described herein. Examples of helper devices include, but are not limited to, routers, mobile communications devices such as cell phones or tablets, computers, and/or laptops. The helper device 104 may generally have a wired power source, although in some examples the helper device 104 may be battery powered. Generally, the helper device 104 may have sufficient power to generate the carrier signal. A single helper device may provide a carrier signal to more than one backscatter device as described herein. Although a single helper device 104 is shown in FIG. 1, any number of helper devices may be used in some examples. In some examples, the helper device 104 may implement media access control protocols. The helper device 104, for example, may transmit the carrier signal once the desired channel (e.g. a channel on which the carrier signal and/or backscattered signal will be transmitted) is determined to be free.

The helper device 104 generally includes RF components, such as frequency synthesizer(s) and/or power amplifiers, which may then not be needed at the backscatter device 108 and/or backscatter device 110. In this manner the helper device. 104 may provide the RF functions for any number of backscatter devices, such as backscatter device 108 and backscatter device 110.

The carrier signal provided by the helper device 104 may be any of a variety of wireless signals which may be backscattered by the backscatter device 108 and/or backscatter device 110 to form a wireless communication signal arranged in accordance with a wireless communication protocol, such as Wi-Fi, ZigBee, and/or SigFox. The carrier signal may be a continuous wave or a protocol-specific carrier signal (e.g. a Bluetooth, Wi-Fi, ZigBee, and/or SigFox signal). In some examples, the carrier signal may be a spread spectrum signal. In some examples, the carrier signal may be a frequency hopped signal. In some examples, the carrier signal may be a continuous wave signal. In some examples, one or more characteristics of the continuous wave signal (e.g. the frequency, amplitude, and/or phase) may be selected in accordance with a particular wireless protocol and/or frequency and/or amplitude and/or phase that the receiver 106 is configured to receive. In some examples, the carrier signal may be a single-frequency tone signal.

In some examples, the carrier signal may be a data-free signal. For example, data decodable by the receiver may not be encoded in the carrier signal. In some examples, the carrier signal may be implemented using a predetermined data signal. For example, the carrier signal may not be encoded with data that is not predetermined and/or generated at the helper device 104. In some examples, the carrier signal may be a non-payload signal. For example, a data payload detectable by the receiver 106 may not be included in the carrier signal. In some examples, the carrier signal may be a signal based on media access control sublayer processing performed by the helper device 104.

The helper device may in some examples detect an unused portion of a spectrum and/or wireless communication channel. For example, the helper device may detect that a wireless communication channel, or portion thereof, is unused, and may selectively transmit a carrier signal on the wireless communication channel, or portion thereof, which is unused. In some examples, the carrier signal transmission may proceed only after the helper device determines that the wireless communication channel used by the carrier signal is unused. In some examples, additionally or instead, the helper device may detect that a wireless communication channel on which a backscatter signal is intended to be received, or portion thereof, is unused, and may selectively transmit a carrier signal when the receive channel is unused.

For example, traditional Wi-Fi communications share the network using carrier sense. However, carrier sense generally requires a Wi-Fi receiver that is ON before every transmission. Since traditional Wi-Fi receivers require power-consuming RF components such as ADCs, frequency synthesizers, and LNA, a requirement to conduct carrier sense at the backscatter device 108 and/or backscatter device 110 may reduce the overall power savings achieved from using backscatter techniques. Accordingly, in examples described herein, carrier sense may be performed by the helper device 104 and may not be performed by backscatter devices, such as the backscatter device 108 and/or backscatter device 110. Generally, the helper device 104 may perform carrier sense and signal a backscatter device, such as backscatter device 108 and/or backscatter device 110 when to transmit. The helper device 104 may also arbitrate the channel between multiple backscatter devices and address other link-layer issues including ACKs and retransmissions.

The backscatter device 108 and backscatter device 110 may be implemented using and/or together with any devices having backscatter communication capability, such as, but not limited to, tags, mobile communication devices such as cell phones or tablets, computers, and/or laptops. Other devices may be implemented having backscatter communication capability, including but not limited to sensors, wearable devices such as watches, eyeglasses, contact lenses, and/or medical implants. It is anticipated that the backscatter devices may have a sufficiently small form factor and low power requirement as to be able to be incorporated in or attached to any object and provide communication functionality for the object and/or associated with the object. In this manner, backscatter devices may be placed ubiquitously in an environment, and facilitate Internet of Things (IoT) and/or other ubiquitous sensor functionality. Although two backscatter devices are shown in FIG. 1, it is to be understood that any number of backscatter devices may be used, including one backscatter device. In other examples, 10, 20, 30, 40, 50, 60, 70, 80, 90, 100 or more backscatter devices may be present in the system 102.

Generally, backscatter devices, such as the backscatter device 108 and backscatter device 110 function to present varying impedance to a carrier signal such that, for example, the carrier signal is either reflected or absorbed by the backscatter device at any given time. In this manner, for example a '1' may be indicated by reflection, and a '0' by absorption, or vice versa, and the carrier signal may be backscattered into a data-carrying signal. Accordingly, in some examples, a data-carrying signal may be provided through backscatter using only the energy required to alter an impedance at a backscatter device's antenna. In this manner, the backscatter devices may transmit data-carrying signals at lower power than if the backscatter devices had themselves generated the carrier signals.

Backscatter devices described herein, such as backscatter device 108 and backscatter device 110 may generally be ultra-low power devices. For example, backscatter devices described herein may eliminate or reduce the need for power hungry communication components (e.g. RF signal generators, mixers, analog-to-digital converters, etc., which may be present in the helper device 104). In this manner, backscatter devices described herein may consume microwatts of power to transmit data, which may improve the battery life of the component (e.g. sensor) utilizing the communication capability of the backscatter device. Backscatter devices may perform digital baseband operations, such as coding and/or modulation.

The backscatter signal backscattered by the backscatter device 108 and/or backscatter device 110 may be a signal produced using subcarrier modulation performed by the backscatter device 108 and/or backscatter device 110. In some examples, the frequency of the backscattered signal may be frequency-shifted from that of the carrier signal. In some examples, data may be encoded in the backscattered signal using phase- and/or amplitude-shift keying. In some examples, the backscattered signal may be based on phase-shift keying (e.g. QPSK and/or BPSK) and/or amplitude-shift keying subcarrier modulation performed by the backscatter device 108 and/or backscatter device 110. Accordingly, backscatter devices described herein, including the backscatter device 108 and the backscatter device 110 may provide backscatter signals in accordance with wireless communication protocols that utilize phase- and/or amplitude-shift keying (e.g. Wi-Fi, ZigBee, SigFox). In some examples, the backscattered signal may include DSSS and/or CCK spreading sequences, which may be added by the backscatter device 108 and/or backscatter device 110. In some examples, the backscattered signal may include a payload, added to a signal generated by the helper device 104 after receipt of the carrier signal at the backscatter device 108 and/or backscatter device 110. In some examples, the backscattered signal may include a packet, decodable at the receiver 106 based on a particular protocol or standard implemented by the receiver 106. In some examples, the backscattered signal may include data detected at the backscatter device 108 and/or backwater device 110 and added to a predetermined, frequency-specific carrier signal.

Backscatter devices and/or helper devices described herein, such as backscatter device 108, backscatter device 110, and/or helper device 104, may each include multiple antennas. In this manner, antenna diversity may be leveraged and multiple-input-multiple-output (MIMO) techniques may be used. For example, the helper device 104 may distribute the carrier signal across multiple antennas based on the wireless channel, which may improve winless signal propagation from the helper device 104 to the backscatter device 108 and/or 110 to the receiver 106.

The receiver 106 may be implemented using any electronic device capable of receiving wireless communication signals (e.g. wireless communication device) formatted in the protocol provided by the backscatter devices backscatter device 108 and/or backscatter device 110, such as Wi-Fi and/or ZigBee. Generally, any electronic device (e.g. wireless communication device) may be used to implement receiver 106 including, but not limited to, Wi-Fi access points, Wi-Fi routers, ZigBee hubs, routers, mobile communications devices such as cell phones or tablets, computers, and/or laptops. In some examples, the helper device 104, receiver 106, and backscatter device 108 and/or backscatter device 110 may be physically separate devices.

While shown as a separate device from the helper device 104, in some examples the helper device 104 and receiver 106 may be integrated and/or may be the same device. For example, an electronic device may include multiple antennas in some example. One or more antennas in some examples may provide the carrier signal (e.g. provide the helper device 104) while one or more antennas, different from those providing the carrier signal in some examples, may receive the signal transmitted by one or more backscatter devices (e.g. provide the receiver 106). In some example, the helper device and the receiver may be integrated into a single device. Cancellation circuitry may be provided in the integrated device to suppress (e.g. cancel) the carrier signal transmitted by the helper device at the receiver.

The receiver 106 may receive transmission from the backscatter device 108 and/or backscatter device 110 in the presence of interference from the carrier signal transmitted by the helper device 104. In some examples, specialized hardware may be used by the receiver 106 (e.g. a full-duplex radio) to cancel this interfering signal, however that may not be compatible with existing Wi-Fi devices. In some examples, the helper device 104 may provide a carrier signal that is made up of frequencies (e.g. a single-frequency tone or a multi-frequency signal) outside a desired frequency channel tier the transmissions of the backscatter device 108 and/or backscatter device 110. This may ensure and/or aid in the receiver 106 suppressing the out-of-band interference from the helper device 104. For example, Wi-Fi receivers may increasingly be required to work even in the presence of interference in an adjacent band, such as interference that is 35 dB stronger. Accordingly, if the helper device 104 transmitted a carrier signal in the adjacent band, a traditional Wi-Fi receiver may be used to implement 106 and would maintain function in the presence of the interfering signal. Further, as Wi-Fi and Bluetooth radios are being integrated onto single chipsets, Wi-Fi hardware is being designed to work in the presence of out-of-band Bluetooth interference. Accordingly, in some examples, the helper device 104 may provide a Bluetooth carrier signal and a Wi-Fi chipset in the receiver 106 may operate appropriately to receive Wi-Fi transmissions from the backscatter device 108 and/or backscatter device 110 even in the presence of the interfering Bluetooth signal.

In some examples, some physical separation is provided between helper device 104 and receiver 106. For example, excessive out-of-band interference may occur if the receiver 106 is too close to the helper device 104 such that the transmission of the carrier signal by the helper device 104 saturates and/or compresses the RF front end of the receiver 106, degrading Wi-Fi performance. This is generally referred to as the input 1 dB compression point, which may be around 0 dBm for commercial Wi-Fi devices.

The helper device 104 and receiver 106 described herein may change functionality from time to time in some examples. For example, while the helper device 104 at may function as described with reference to a helper device, the helper device 104 may at times function as a receiver in some examples, while the receiver 106 may function as a helper device at times. For example, a router (e.g. a Wi-Fi router) may be used having multiple modes of operation. In one mode of operation, the router may be used to implement the helper device 104, while in another mode, the muter may be used to implement the receiver 106. The same device can time multiplex its functionality in some examples, such that the helper device 104 may be integrated and/or incorporated with the receiver 106.

In some examples, multiple helper devices and/or receivers may be present in a system. In some examples, a single device (e.g. a router) may serve as a helper device at certain times and as a receiver at other times. In some examples, multiple (e.g. two) devices may be present in a system, each able to serve as either a helper device or a receiver. For example, the device may function as a helper device (e.g. be configured to transmit a carrier signal) in one mode, and a receiver (e.g. be configured to receive a backscattered signal) in a second mode. Accordingly, the two devices may trade off serving as the helper device at any instance of time. For example, at one time Router 1 may function as the helper device whereas Router 2 may function as the receiver and at another time instant the roles may be reversed. Different time allocations may be used in some examples and a larger number of routers may be present in some examples.

In examples having multiple helper devices and/or receivers, the helper devices and/or receivers may be positioned across an area to maximize and/or improve spatial coverage by the carrier signal and/or spatial coverage for receipt of backscattered signals. In some examples, a helper device of the plurality of helper devices in a system may be selected to act as a helper device (in some examples, the selection may be specific to a specific backwater device or group of backscatter devices) based on proximity of the candidate helper device to the backscatter device. In some examples, the selection may be made based on a candidate helper device of the plurality of helper devices having a better reception of a backscattered signal than another of the plurality of helper devices.

Figure 2:
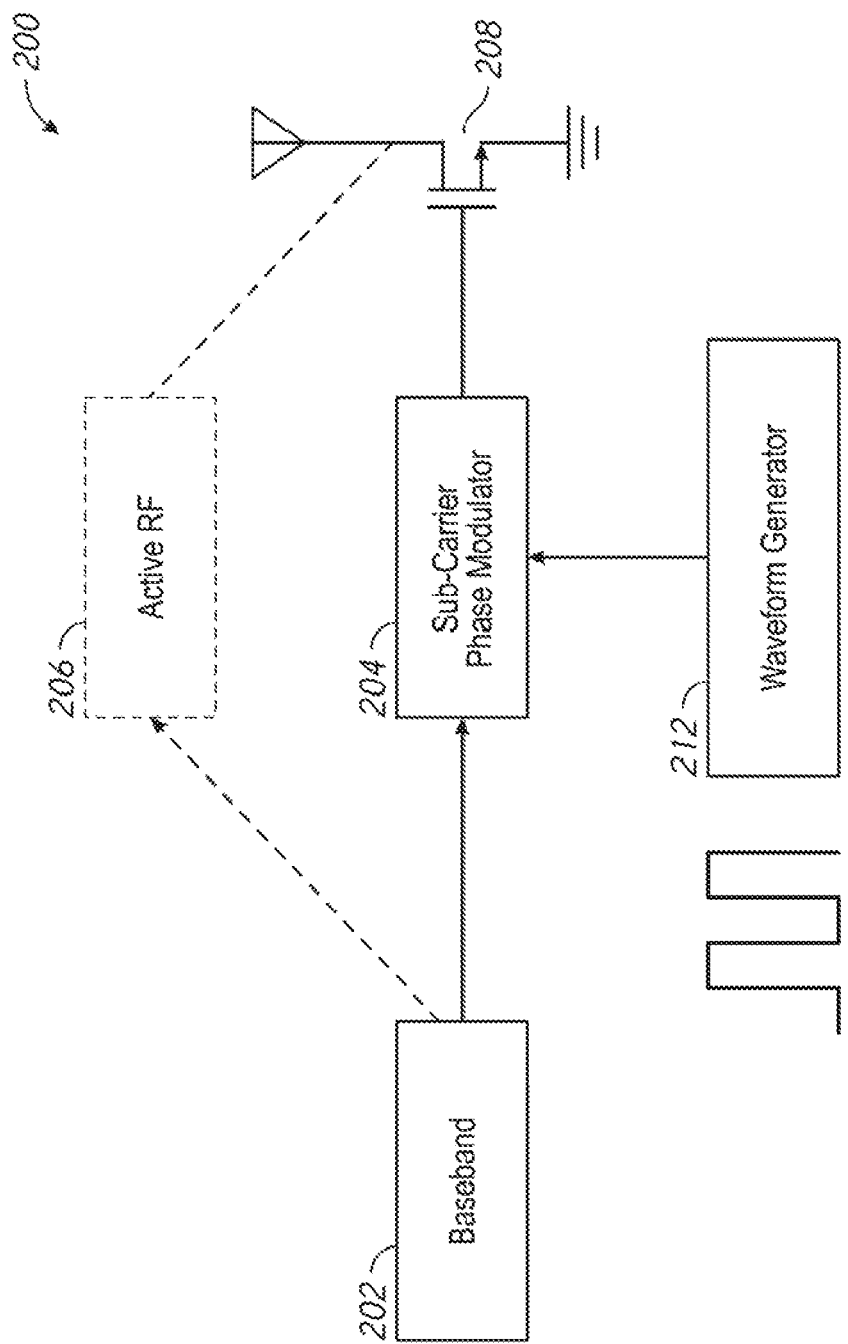
FIG. 2 is a schematic illustration of a backscatter device arranged in accordance with examples described herein.

FIG. 2 is a schematic illustration of a backscatter device arranged in accordance with examples described herein. The backscatter device 200 may be used to implement, for example, the backscatter device 108 and/or backscatter device 110 of FIG. 1. The backscatter device 200 includes baseband 202, sub-carrier phase modulator 204, active RF 206, switch 208, and waveform generator 212.

Backscatter devices generally operate by changing antenna impedance. The effect of changing the antenna impedance can be understood to cause the radar cross-section, e.g., the signal reflected by the antenna, also to change between the two different states. Given an incident signal with power $P_{incident}$, the power in the backscattered signal may be expressed as $$P_{backscatter} = P_{incident} \frac{|\Gamma_1^* - \Gamma_2^*|^2}{4} \quad \text{Equation 1}$$

where $\Gamma_1^*$ and $\Gamma_2^*$ are the complex conjugates of the reflection coefficients corresponding to two impedance states. To maximize the power in the backscattered signal, the difference in the power of the two impedance states which is generally maximized, as given by $$|\Gamma|^2 = \frac{|\Gamma_1^* - \Gamma_2^*|^2}{4} \quad \text{Equation 2}$$

To have the power in the backscattered signal equal to that of the incident signal, the left had side of equation 2 may be set to 4, which can be achieved by modulating the reflection coefficients between +1 and −1. In practice, however, backscatter hardware may deviate from this ideal behavior and incurs losses, which are acceptable in practice; one example hardware implementation had a loss of around 1.1 dB.

By utilizing a switch (e.g. switch 208), the antenna impedance may toggle between two impedance states. Examples of backscatter device 200 may generate transmissions (e.g. Wi-Fi transmissions) using this binary system.

Generally, the backscatter device 200 may shift a frequency of a carrier signal by the backscatter device 200. For example, the frequency may be shifted from a single-frequency tone provided outside a desired Wi-Fi transmission channel to a frequency within the desired Wi-Fi transmission channel (e.g. the center frequency of the desired Wi-Fi transmission channel). The frequency-shifted signal may be used to provide wireless communication signal (e.g. Wi-Fi signals). Generally, to shift the frequency of the carrier signal, the switch 208 may be operated at a frequency $\Delta f$ equal to an amount of desired frequency shift. Digital encoding may be performed using digital logic and phase changes may be implemented in some examples by modifying a phase of a square wave (e.g. used to approximate a sine wave). In this manner, the digital backscatter device 200 may synthesize wireless communication signals (e.g. Wi-Fi signals) while operating in the digital domain at baseband.

For example, the backscatter device 200 may backscatter a single-frequency tone signal, e.g. provided by the helper device 104 of FIG. 1. The single-frequency tone signal may be written as $\sin 2\pi(f_{wifi}-\Delta f)t$, where $f_{wifi}$ is the desired frequency of Wi-Fi transmission by the backscatter device, and $\Delta f$ is the frequency of a waveform utilized by the backscatter device. The backscatter device 200 may utilize a square wave at a frequency $\Delta f$ (e.g. provided by the waveform generator 212) to shift the tone to $f_{wifi}$. The square wave provided by the waveform generator 212 can be approximated as $$\frac{4}{\pi}\sin 2\pi\Delta f t \quad \text{Equation 3}$$

Since modulating the radar cross section of an antenna effectively multiplies the incoming signal by the modulated signal, the backscatter signal can be approximated as $\sin 2\pi(f_{wifi}-\Delta f)t \sin 2\pi\Delta ft$. In this manner, backscatter has created two tones, one at $f_{wifi}$ and one at $f_{wifi}-2\Delta f$ from the initial single-tone signal.

Accordingly, backscatter devices described herein, including the backscatter device 200 of FIG. 2, may provide backscatter signals having a frequency that is shifted from the frequency of a carrier signal by a difference frequency. The difference frequency may be a frequency of (or included in) a waveform provided to the subcarrier modulation circuitry.

Data may be transmitted in backscatter signals in a number of ways. In some examples, reflection and/or absorption of the carrier signal itself may be utilized to encode data. For example, a carrier wave may be implemented using a signal having packets or other data (e.g. a Wi-Fi signal). The backscatter device may transmit and/or reflect packets of the carrier signal to indicate a '1' or '0' (or vice-versa). In some examples, phase- and/or amplitude-shift keying may be performed by the backscatter device to encode data in the backscatter signals. For example, following creation of a tone centered at the Wi-Fi channel ($f_{wifi}$), 802.11b transmissions using backscatter may be generated.

802.11b uses DSSS and CCK encoding which are both digital operations and hence can be performed using digital logic at the passive Wi-Fi device (e.g. by baseband 202). The backscatter device 200 may generate signals in accordance with a phase-shift keying protocol (e.g. QPSK, BPSK, DBPSK and/or DQPSK) using a square wave created at a frequency $\Delta f$, which may be understood by noting that DBPSK and DQPSK use a sine wave with four distinct phases: 0, $\pi/2$, $\pi$, and $3\pi/2$. Since the square wave provided by switch 208 can be approximated as a sine wave, the four phases may be provided by changing the timing of the square wave provided by the waveform generator 212. For example, shifting the square wave by half of a symbol time effectively creates a phase change of $\pi$, phase changes of $\pi/2$ and $\pi/2$ can be achieved by shifting the square wave by one-fourth and three-fourth of a symbol time. In this manner backscatter devices, such as backscatter device 200 may fully operate in the digital domain while run at a baseband frequency of a few tens of MHz and synthesize 802.11b transmissions using backscatter.

During operation, the baseband 202 may provide data for communication to the sub-carrier phase modulator 204, which may also be referred to as a sub-carrier modulator. It is to be understood that even when referred to as a sub-carrier phase modulator, phase modulation may not be performed in all examples. The waveform generator 212 may provide a waveform to the sub-carrier phase modulator 204. A frequency of the waveform may be selected as a difference between a frequency of the carrier signal and a desired frequency of the backscatter signal (e.g. frequency at which a receiver may receive the backscatter signal). The data may be provided in the backscatter signal in several ways. In some examples, the sub-carrier phase modulator 204 may control the switch 208 to reflect and/or absorb portions of the carrier signal (e.g. packets) in accordance with the data. For example, packets of the carrier signal may be reflected to indicate a '0' and absorbed to indicate a '1', or vice versa. In some examples, the sub-carrier phase modulator 204 may alter a phase, amplitude, or both of the waveform provided by the waveform generator 212 to provide an output signal. The output signal may be used to control a switch 208 to backscatter a carrier signal into a data-carrying signal formatted in accordance with a wireless communication protocol utilizing phase-shill keying, a wireless communication protocol using amplitude-shift keying, or combinations thereof.

Some example backscatter devices may additionally include active RF 206 components such that in one, mode, the backscatter device 200 may backscatter signals and have low power (e.g. backscatter) operation, while in another mode the backscatter device 200 may utilize active RF 206 to transmit wireless communication signals conventionally (e.g. generating the device's own carrier signal). The backscatter components and active RF 206 may utilize a same antenna, as shown in FIG. 2, and the antenna connection may be switched between the active RF 206 and sub-carrier phase modulator 204 in some examples by control circuitry (not shown in FIG. 2). In other examples, the active RF 206 and sub-carrier phase modulator 204 may utilize different antennas.

The antenna may be connected to a switch which selects between the active RF 206 radio and the sub-carrier phase modulator 204. The selection may be made, for example, on a basis of proximity to a helper device. In some examples, when the backscatter device is in the range of a helper device it may couple the sub-carrier phase modulator 204 to the antenna to perform low power transmissions (e.g. Wi-Fi transmissions). However, when the backscatter device is outside the range of the helper device, the antenna may be coupled to active RF 206.

Baseband 202 may be implemented using typical baseband circuitry for the wireless communication protocol of interest, e.g. Wi-Fi baseband circuitry and/or ZigBee baseband circuitry. Generally, the baseband 202 includes digital circuitry components which may be relatively low power. The baseband 202 may provide encoding in accordance with the wireless communication protocol of interest (e.g. DSSS and CCK encoding for 802.11b transmissions). The data provided by the baseband 202 may originate from one or more sensors which may be coupled to and/or integrated with the backscatter device 200 in some examples. Any number of sensors may be used, including but not limited to, temperature sensors, vibration sensors, humidity sensors, glucose sensors, pH sensors, blood oxygenation sensors, GPS sensors, optical sensors, cameras, and/or microphones. In this manner, sensor data may be provided that may be transmitted by the backscatter device 200.

In some examples, the backscatter device 200 may implement WPA/WPA2 and ensure that its Wi-Fi transmissions comply with the Wi-Fi security specifications. Since these are digital operations, the baseband 202 may implement them on the backscatter device 200 using baseband processing.

Although not shown in FIG. 2, the backscatter device 200 may include a power source, such as a battery and/or energy harvesting system. The battery may be implemented using a lithium ion battery. In some examples additionally or instead, energy harvesting components may be provided to power the backscatter device 200, including, but not limited to, components for harvesting solar energy, thermal energy, vibrational energy, or combinations thereof. The power source may power the baseband 202, sub-carrier phase modulator 204, and waveform generator 212. In some examples, the active RF 206 may be used when a larger power source than the power source used to power those backscatter components is available (e.g. a wired power source).

The sub-carrier phase modulator 204 may be implemented using circuitry that may adjust a phase, amplitude, or both of a waveform. In some examples, an FPGA may be used to implement sub-carrier phase modulator 204. The sub-carrier phase modulator 204 is connected to the baseband 202 and may receive data from the baseband 202. The sub-carrier phase modulator 204 may be further connected to the waveform generator 212 and may receive a waveform provided by the waveform generator 212. The sub-carrier phase modulator 204 may alter a phase, amplitude, or both, of the waveform in accordance with the data from the baseband 202 to provide an output signal. The sub-carrier phase modulator 204 may be coupled to the switch 208 and may provide the output signal to the switch 208.

Note that, on the physical layer, ZigBee uses offset QPSK and direct sequence spread spectrum (DSSS) in the 2.4 GHz ISM band, Wi-Fi is generally implemented using BPSK/QPSK modulation with DSSS/CCK spreading sequences. To create phase changes used for the DBPSK/DQPSK modulation, the sub-carrier phase modulator 204 may alter a phase of a square wave provided by waveform generator 212 by changing the timing of the wave. The sub-carrier phase modulator 204 may utilize QPSK modulation in other examples to synthesize a Wi-Fi and/or ZigBee packet. In some examples, a payload of the packet may include the spreading sequence for the carrier signal. For example, the spreading sequence may be provided by the baseband 202 and/or may be stored in a memory on the backscatter device 200.

In some examples, an analog based technique may be used to implement phase shift keying. Instead of choosing the phase of the waveform provided by waveform generator 212 based on the data provided by baseband 202, in some examples, phase shift keying may be implemented, for example by replacing the switch 208 with a multiplexer or switching network and switching the antenna impedance between four impedance states (e.g. which may all be placed 90° apart in phase on a circle) to implement phase shift keying. Amplitude shift keying may be implemented in an analogous manner.

Switch 208 may be implemented using generally any circuitry for altering impedance presented to an antenna, such as a transistor. The switch 208 is coupled between the sub-carrier phase modulator 204 and an antenna of the backscatter device 200. In the example of FIG. 2, the switch 208 is implemented using a transistor. Any of a variety of antenna designs may be used. The antenna may be operational in the frequency of the carrier signal and the frequency of the backscatter signal. A high output signal provided by the sub-carrier phase modulator 204 to the gate of the switch 208 accordingly may turn the transistor on, presenting a low impedance to the antenna. A low output signal provided by the sub-carrier phase modulator 204 to the gate of the switch 208 accordingly may turn the transistor off, presenting a high impedance to the antenna. The switch 208 may generally run at a baseband frequency—e.g. a much lower frequency than a frequency of a carrier signal provided to the backscatter device 200. In some examples, the switch 208 may be operated at a frequency of 50 MHz or lower, although other frequencies may also be used in other examples.

Waveform generator 212 may provide a waveform to the sub-carrier phase modulator 204. Any periodic waveform may generally be used including, but not limited to, a square wave, sine wave, cosine wave, triangle wave, sawtooth wave, analog signal, multi-level signal, or combinations thereof. The waveform generator 212 may be implemented using, hardware, software, or combinations thereof. For example, the waveform generator 212 may be implemented using an oscillator. The phase of a waveform provided by the waveform generator 212 having an oscillator may be altered, for example, by changing a phase of a clock signal provided to the oscillator. In some examples, the waveform generator 212 may be implemented using an FPGA, DSP, and/or microprocessor and executable instructions to provide the desired waveform at the desired frequency.

Generally, the carrier signal may have a particular frequency—e.g. a single tone, a frequency used in Bluetooth, ZigBee, and/or other wireless communication protocol. It may be desirable for the backscatter device 200 to transmit a backscattered signal at a particular frequency (e.g. at a frequency used in Bluetooth, ZigBee, or other wireless communication protocol). It may be desirable for the backscattered signal to occur at a different frequency than the carrier signal, for example to avoid or reduce interference between the carrier signal and the backscattered signal.

The waveform generator 212 may provide a waveform at a frequency which may be selected to be a frequency equal to a difference between a frequency of the carrier signal and a desired frequency for transmission of a backscattered signal. The sub-carrier phase modulator 204 may control the switch 208 at the frequency of the waveform provided by the waveform generator 212 which may effectively mix the frequency of the carrier signal with the frequency of the waveform, resulting in a backscattered signal at a frequency of the carrier signal +/− the frequency of the waveform. Accordingly, a backscattered signal at a desired frequency may be achieved by providing a waveform to the sub-carrier phase modulator 204 having a frequency equal to a difference between the frequency of the carrier signal and the desired frequency of backscatter transmission.

In some examples, the carrier signal may be a frequency hopped signal. The waveform generator 212 may provide a waveform having a frequency that hops in accordance with the hopping of the frequency hopping signal used to implement the carrier signal such that the frequency hopping carrier signal may be backscattered by the backscatter device 200. For example, the carrier signal may be a frequency hopped signal which has a sequence of frequencies over time. The receive frequency may generally be fixed. Accordingly, the waveform generator 212 may provide a waveform having a sequence of frequencies such that the data is transmitted at the constant receive frequency over time, despite the hopping frequency of the carrier signal.

A variety of techniques may be used to select the sequence of frequencies for the waveform. In some examples, the sequence of frequencies of the frequency-hopped carrier signal may be received by the backscatter device over a downlink from the helper device used to transmit the carrier signal. In some examples, the sequence of frequencies may be known (e.g. a pseudorandom sequence). The backscatter device may include a memory that may store the sequence of frequencies of the frequency-hopped carrier signal and/or the sequence of frequencies used for the waveform, or indications thereof.

In some examples, backscatter devices described herein may include frequency determination circuitry coupled to an antenna for sensing the carrier signal (e.g. the antenna used to backscatter may be used). The frequency determination circuitry may sense the frequency of the carrier signal and compute a difference between the frequency of the carrier signal and the desired frequency of backscatter signal and provide an indication of the difference (e.g. to be used as the waveform frequency) to the waveform generator such that the waveform generator may provide the waveform at the indicated difference frequency.

In some examples, the carrier signal may be a spread spectrum signal, such as a direct spread spectrum (DSS) signal. Generally, direct spread spectrum refers to techniques where energy may be spread across multiple frequencies (e.g. a frequency band) by coding data in a particular manner using a code or coding sequence. Coding sequences may be pseudorandom sequences, and examples include m-sequences, barker codes, gold codes, and Hadamard Walsh codes.

In some examples, a time at which backscattering begins may need to be synchronized to the spread spectrum carrier signal. For example, data may be provided in a backscattered signal in some examples by altering the carrier signal. In examples where the carrier signal comprises a spread spectrum signal, the backscatter device may begin backscattering when a particular portion of the carrier signal is presented to the backscatter device (e.g. the backscatter device may synchronize backscattering of data with data in the carrier signal). In some examples, the sub-carrier phase modulator of a backscatter device may begin backscatter at a time based on features of the carrier signal. Features may include data present in the carrier signal at a particular time and/or a location within an overall spreading sequence at a particular time.

In some examples, the sub-carrier phase modulator may begin backscatter responsive to a synchronization signal from another device. For example, a master synchronization may be provided where a device (e.g. the helper device) may provide a signal to the backscatter device to indicate a time to begin backscatter relative to the spread spectrum carrier signal.

Data may be provided in the backscatter signal in several ways. In some examples, such as in some examples where the carrier signal includes packets or other data (e.g. a Wi-Fi, ZigBee, and/or SigFox signal), data may be provided in the backscatter signal by reflecting and/or absorbing portions (e.g. packets) of the carrier signal in accordance with the data to be transmitted. A receiver may decode the presence of a packet in the backscatter signal as a '1' (or a '0' in some examples) and the absence of a packet in the backscatter signal as a '0' (or a '1' in some examples). In some examples, the backscatter device may encode data in the packet sequence number transmittal by the helper device.

In some examples, data may be provided in the backscatter signal by altering a phase, amplitude, or combinations thereof, of the waveform provided to the sub-carrier modulation circuitry in accordance with the data to perform phase-shift keying and/or amplitude-shift keying. In this manner, the backscatter device 200 may create wireless communication transmissions (e.g. which may be arranged in accordance with a standard wireless communication protocol, such as but not limited to Wi-Fi 802.11a, 802.11b, 802.11g, 802.11n, ZigBee, and/or Bluetooth). Since the backscatter device 200 has no (or fewer) analog components, it may generally consume less silicon area and be smaller and cheaper than existing transmission devices, such as Wi-Fi chipsets. Further, its power consumption may be significantly lower as it may only have a need to perform digital baseband operations.

The backscatter device 200 may further include a receiver for receiving signaling message from, e.g. the helper device 104. In examples described herein, the helper device 104 may provide signaling packets which may, for example, be created using amplitude modulation such as ON/OFF keying. The backscatter device 200 may include a passive energy detector with analog components and a comparator to distinguish between the presence and absence of energy. In this manner, signaling packets may be received while consuming low power, 18 mW in some examples.

Figure 3:
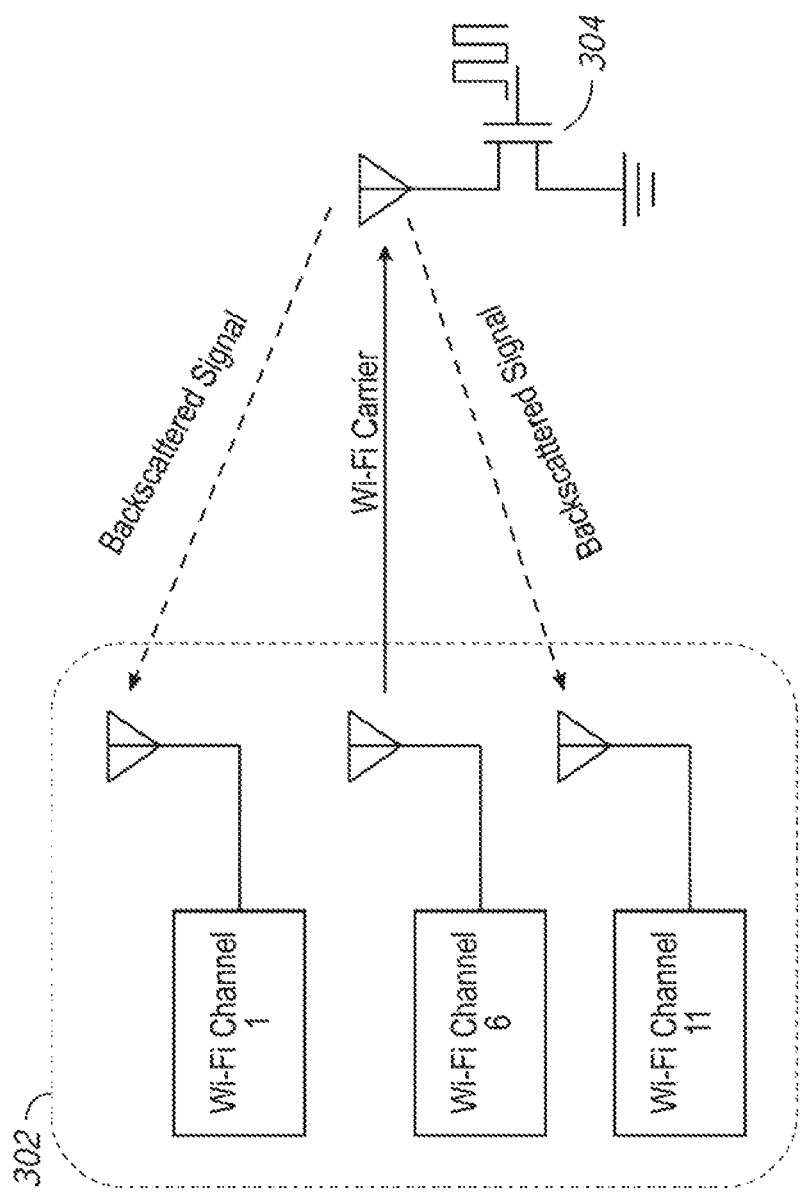
FIG. 3 is a schematic illustration of a system arranged in accordance with examples described herein.

FIG. 3 is a schematic illustration of a system arranged in accordance with examples described herein. The system of FIG. 3 includes access point 302 and backscatter device 304. The access point 302 may be used to implement (and/or may be implemented by) the helper device 104 and receiver 106 of FIG. 1, for example. The backscatter device 304 may be used to implement (and/or may be implemented by) the backscatter device 108, backscatter device 110 of FIG. 1 and/or the backscatter device 200 of FIG. 2 in some examples. The access point 302 may provide a carrier signal, such as a Wi-Fi signal on channel 6, and the backscatter device 304 may backscatter the carrier signal into backscattered signals on Wi-Fi channels 1 and 11.

Generally, non-overlapping Wi-Fi channels may have certain frequency bands. In some examples (such as the example of FIG. 2), separate helper devices and receiver devices may not be needed and/or used. Access point 302, which may be implemented using a Wi-Fi chipset) may provide a carrier signal in one Wi-Fi channel, such as channel 6, which may have a Wi-Fi channel frequency associated with channel 6. The carrier signal may be backscattered by backscatter devices described herein into other Wi-Fi channels. The backscattered communications may be received by the access point 302 on those other Wi-Fi channels, such as Channels 1 and 11, which may have Wi-Fi channel frequencies associated with channels 1 and 11, respectively. Generally, the channel used to provide the carrier signal should have limited or no frequency overlap with the channels on which backscatter communications are provided.

Figure 4:
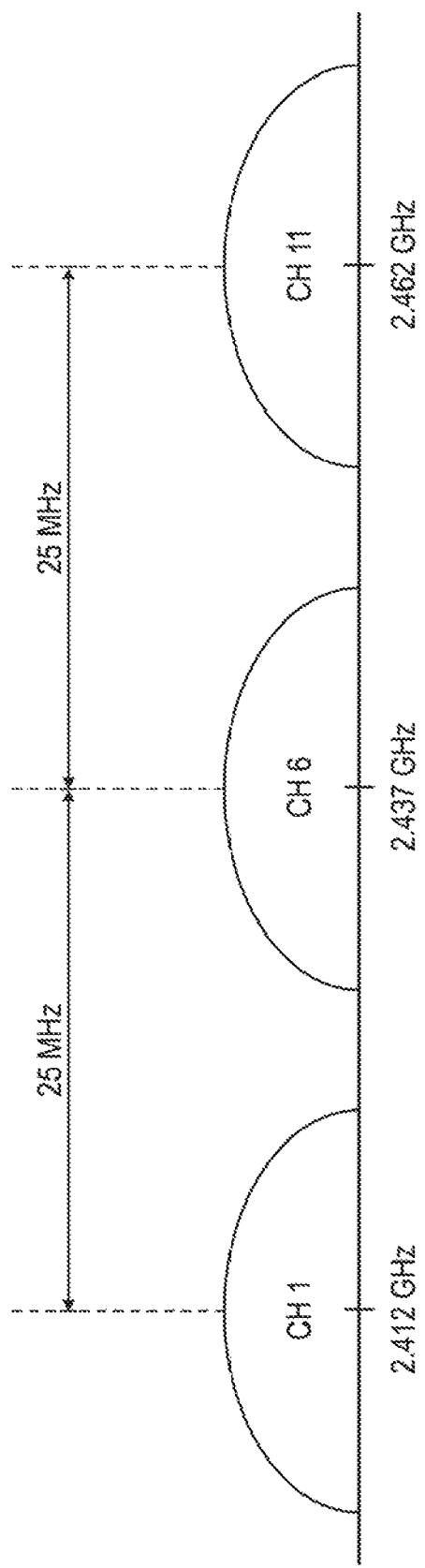
FIG. 4 is a schematic illustration of non-overlapping Wi-Fi channels in the 2.4 GHz ISM hand.

FIG. 4 is a schematic illustration of non-overlapping Wi-Fi channels in the 2.4 GHz ISM band. Channel 1 is centered at 2.412 GHz. Channel 6 is centered at 2.437 GHz. Channel 11 is centered at 2.462 GHz. Accordingly, there is a 25 MHz frequency difference between channel 1 and channel 6. There is a 25 MHz frequency difference between channel 6 and channel 11.

Accordingly, a backwater device, such as the backscatter device 304 of FIG. 3, or any other backscatter device described herein, may utilize a waveform having a frequency of 25 MHz to translate the carrier signal on Wi-Fi channel 6 to a backscattered signal in channels 1 and 11. Any receiver that may operate on channel 1 or 11 may receive those backscattered transmissions.

Generally, then, backscatter devices described herein may utilize waveforms having a frequency equal to a frequency difference between communication channels to translate a carrier signal in one channel into a backscattered signal in the other channel.

Referring to the examples of FIGS. 3 and 4, the backscatter device may provide data in the backscatter signal by reflecting or absorbing portions of the carrier signal to indicate a 1 or 0, respectively (or vice versa). For example, packets of the carrier signal may be reflected or absorbed by the backscatter device to indicate a 1 or a 0 respectively (or vice versa). To achieve this in some examples, referring back to FIG. 2, the sub-carrier phase modulator (which may be referred to as a sub-carrier modulator) of the backscatter device may provide or suppress the waveform received from the waveform generator in accordance with the data to provide an output signal. The switch may control the antenna to backscatter the carrier signal in accordance with the output signal such that the carrier signal frequency is mixed with the waveform frequency to transmit a backscatter signal at the desired receive frequency. Accordingly, the sub-carrier phase modulator may not alter a phase of the waveform and may instead control reflection and absorption of portions (e.g. packets) of the carrier signal.

In the examples of FIGS. 3 and 4, the receiver (e.g. the access point 302 or receiver of FIG. 1) may decode the data by decoding a '1' when a portion (e.g. packet) of the backscattered signal is received, and decoding a '0' When a portion (e.g. packet) of the backscattered signal is absent.

Examples described herein may separate the signaling functions used to control access to a channel, such as carrier sense functionality in Wi-Fi communications, from the data transmission functions. For example, backscatter devices described herein may provide data transmissions compatible with wireless communication protocols. However, the backscatter devices themselves may not perform the transmissions used to ensure controlled access to a channel, such as carrier sense transmissions. Instead, the channel access control transmissions may be performed by another device, such as the helper device 104 of FIG. 1, to relieve the backscatter device of the need to make those transmissions, which may require higher power.

Figure 5:
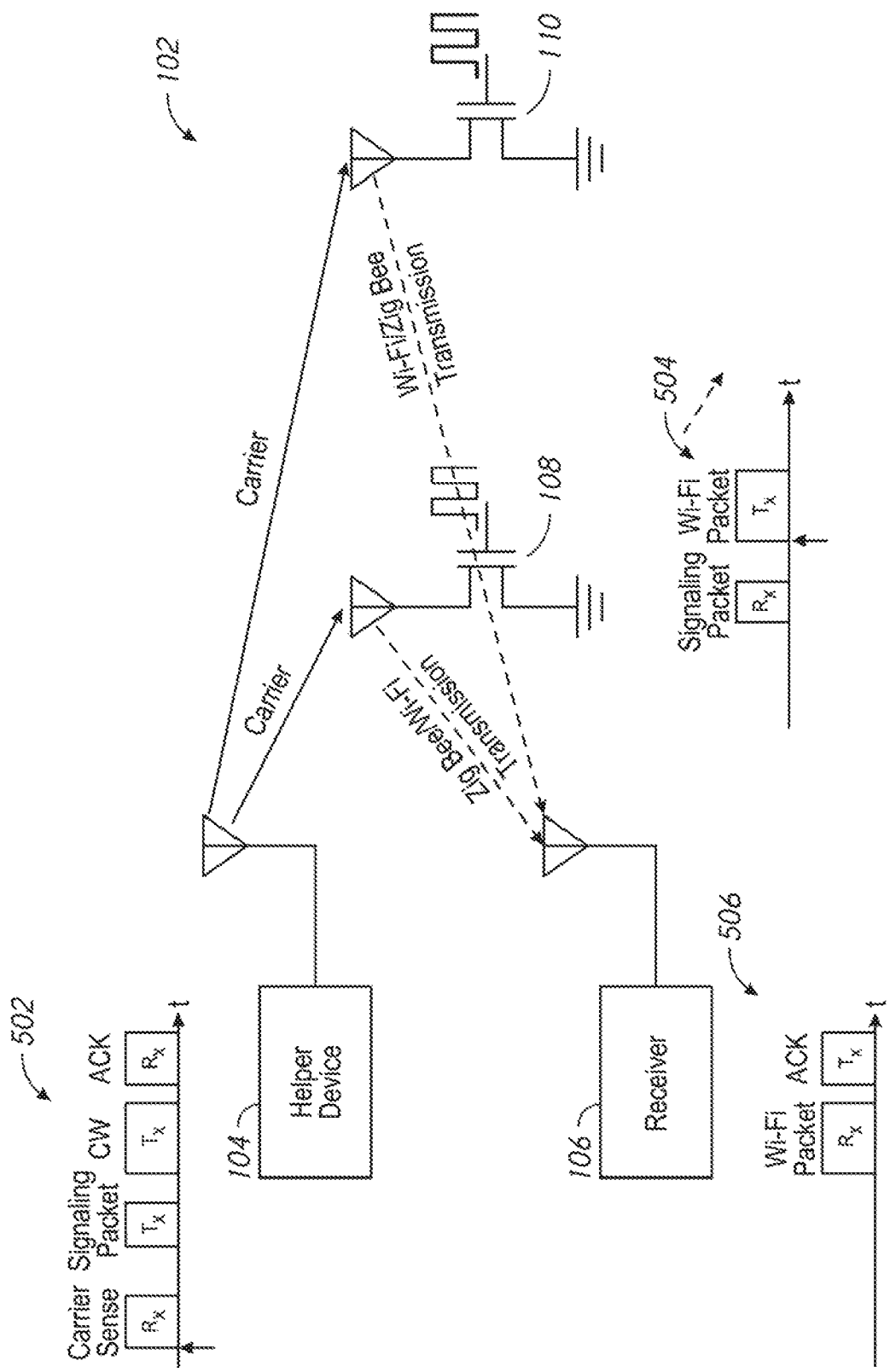
FIG. 5 is a schematic illustration of the system of FIG. 1 including signaling schematics tier several components.

FIG. 5 is a schematic illustration of the system of FIG. 1 including signaling schematics for several components to illustrate a method performed by the system. FIG. 5 illustrates helper device signaling 502, backscatter device signaling 504, and receiver signaling 506. The helper device 104 may perform carrier sense (e.g. receive transmissions on one or more channels to determine if a channel may be free). Note that the helper device 104 may perform carrier sense both the channel of intended communication by a backscatter device, such as backscatter device 108 and/or backscatter device 110, and also on the channel into which the carrier signal is to be transmitted by the helper device 104.

Once the helper device 104 determines the relevant channels to be free, it transmits a signaling packet to each backscatter device that may communicate, and it begins transmission of the carrier (noted as 'CW' in FIG. 5). In some examples, the carrier signal may be transmitted for a fixed time. The helper device 104 may later receive an ACK from the receiver 106 indicating the transmission is complete. In this manner, the carrier sense and ACK functions need not be performed by the backscatter device 108 and/or backscatter device 110.

Turning to backscatter device signaling 504, the backscatter device 108 may receive a signaling packet from the helper device 104. Responsive to receipt of the signaling packet, the backscatter device 108 may transmit one or more packets, such as Wi-Fi packets.

Turning to receiver signaling 506, the receiver 106 may receive the packets transmitted by the backscatter device 108, and on receipt of the packets may transmit an acknowledge message, ACK, which may be received by the helper device 104.

To confirm that the packets were accurately received by the receiver 106, the signaling packet sent by the helper device 104 may include an indication of accurate receipt (or an indication of lack of receipt, e.g. failed receipt). For example, after the helper device 104 receives an acknowledge message, ACK, from the receiver 106, a next signaling packet to the backscatter device 108 may include an indication (e.g. '1') that the ACK was received. If the ACK is not received by the helper device 104 from the receiver 106, the helper device 104 may send a signaling packet to the backscatter device 108 including an indication (e.g. a '0') that the ACK was not received, so that the backscatter device 108 may attempt to retransmit the packets.

For example, consider an example where backwater device 108 intends to send a Wi-Fi packet on channel 6 and the helper device 104 transmits a tone between Wi-Fi channels 1 and 6. Before any of these transmissions happen, the helper device 104 first uses carrier sense to ensure that there are no ongoing transmissions on any the frequencies including and in between channel 1 and 6. Once the channels are found free, the helper device 104 sends a packet signaling a specific backscatter device (e.g. Backscatter device 108) to transmit. This signal may be sent and decoded using an ultra-low power receiver, tar example by using amplitude modulation such as ON/OFF keying at the helper device 104.

Figure 6:
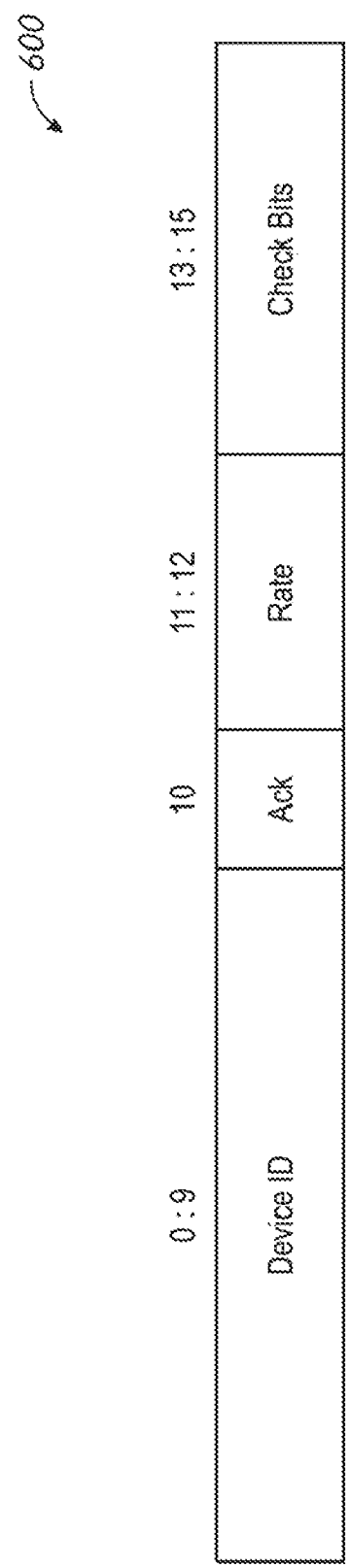
FIG. 6 is a schematic illustration of a signaling packet arranged in accordance with examples described herein.

FIG. 6 is a schematic illustration of a signaling packet arranged in accordance with examples described herein. The signaling packet 600 starts with an identification (e.g. ID) unique to each backscatter device in the system (e.g. Backscatter device 108 or backscatter device 110 of FIG. 1). While shown at the start, in other examples, the ID may be placed in other locations in the packet. The signaling packet 600 further includes an indication of receipt of an ACK. The signaling packet 600 further includes a rate and check bits to assist in decoding.

The helper device 104 receives ACK messages sent by receivers, such as receiver 106, and conveys indications of ACK receipt (or lack of receipt) back to the backscatter devices. For example, if the ACK is successfully decoded at the helper device 104, it may set the ACK bit in the signaling packet 600 to 1 and send it to the backscatter device 108, for example during the next period when the sensor is scheduled to transmit and a signaling packet is sent. If the ACK is not received at the helper device 104 after an expected time, it may perform carrier sense and sends a signaling packet with the ACK bit set to 0. While 1 and 0 are used here as examples, it is to be understood that in other examples, 1 may be used to convey a lack of ACK, and 0 the receipt of ACK, or additional bits or other representations may be used. When the backscatter device receives the indication no ACK message was received by the helper device 104, the backscatter device 108 may retransmit its packets (e.g. Sensor data).

In some examples, the helper device 104 detects an ACK by detecting energy for an ACK duration at the end of the backscatter device transmission.

The signaling packet 600 may also provide rate information for rate adaptation—e.g. the two-bit rate field indicated in FIG. 6. Generally, Wi-Fi bit rate adaptation algorithms may use packet loss as a proxy to adapt the transmitter bit rate. In examples described herein, this function may be performed by helper devices (e.g. devices with sufficient power budget), such as the helper device 104 of FIG. 1. For example, the helper device 104 may estimate the packet loss rate for each of its associated backscatter devices (e.g. backscatter device 108 and/or backscatter device 110) by computing the fraction of successfully acknowledged packets.

The helper device 104 may estimate the best bit rate (e.g. 802.11b bit rate) and encodes this information in the bit rate field of the signaling packet 600. Since the helper device 104 knows the bit rate as well as the packet length, it knows how long the transmissions from each of its backscatter devices would occupy on the wireless medium. Thus, it may stop transmitting its carrier signal at the end of the backscatter transmission and listens for the corresponding ACKs.

The signaling packet 600 may be sent by a helper device (e.g. a device with sufficient power budget to supply a carrier signal), such as the helper device 104 of FIG. 1. In some examples, the signaling packet may be sent using amplitude modulation such as ON/OFF keying. When the backscatter device, such as the backscatter device 108 of FIG. 1, detects its ID, it may transmit within a short interframe spacing (SIFS) duration at the end of the signaling packet. The signaling packet is sent at the center of the desired channel for carrier signal (e.g. between channels 1 and 6 in this example), and at the center of the desired channel for backscatter transmission (e.g. channel 6 in this example). This may prevent other devices in the ISM band from capturing the channel before the backscatter device gets to transmit. The signaling packet 600 has 16 bits and in some examples adds a fixed overhead of 100 ms for every backscatter transmission.

The helper device 104 may advantageously know when to send the signaling packet to each of the backscatter devices in the network. As an example of how this may be achieved, consider an Internet of Things application. A device sending out beacons may be configured to send them at a fixed rate. Temperature sensors, microphones and Wi-Fi cameras, for example (e.g., Dropcam) may have a fixed rate at which they generate data. Similarly, motion sensors may have an upper bound on the delay they can tolerate. Accordingly, backscatter devices described herein may have a fixed rate and/or a maximum rate at which they conduct data transfer (e.g.

rate of data transmissions). The backscatter devices (e.g. Backscatter device 108 and/or backscatter device 110) may convey the fixed data rate and/or maximum data rate to the helper device 104 during an initial association procedure (and can update it later as needed).

The fixed data rate and/or maximum data rate may be used by the helper device 104 to signal each backscatter device in accordance to its fixed and/or maximum data rate.

Figure 7:
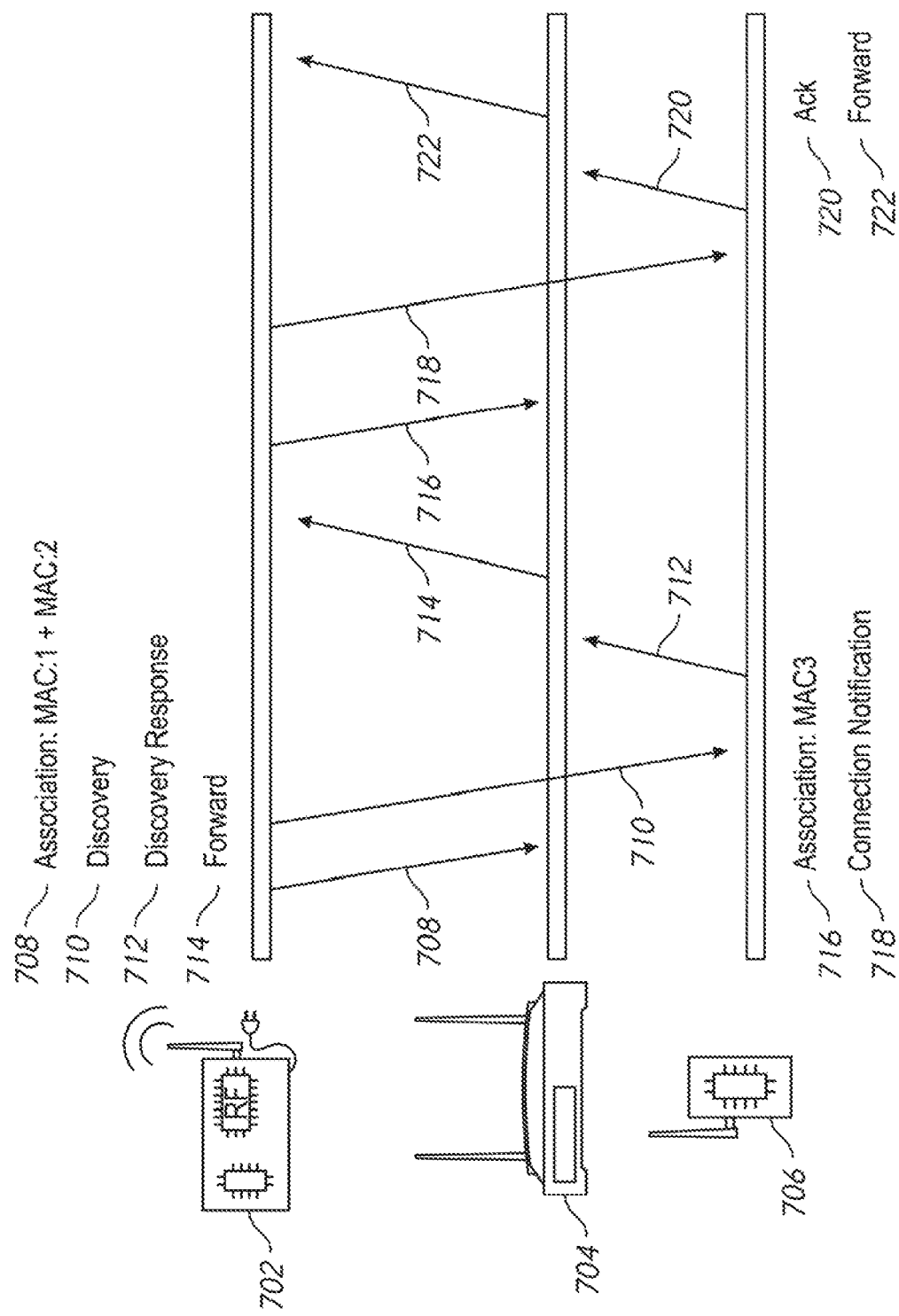
FIG. 7 is a schematic illustration of network association method in a system arranged in accordance with examples described herein.

FIG. 7 is a schematic illustration of network association method in a system arranged in accordance with examples described herein. FIG. 7 illustrates an example of how a backscatter device 706 may associate with a helper device 702 and a receiver 704 in a wireless network (e.g. WLAN). The backscatter device 706 may be implemented to backscatter Wi-Fi signals. The backscatter device 706 may be used to implement and/or be implemented by any backscatter device described herein, such as the backscatter device 108 or backscatter device 110 of FIG. 1, the backscatter device 200 of FIG. 2, and/or the backscatter device 304 of FIG. 3. The receiver 704 may be implemented using a Wi-Fi router. The receiver 704 may be used to implement and/or be implemented by any receiver described herein, including the receiver 106 of FIG. 1. The helper device 702 may be implemented using a plugged-in device. The helper device 702 may be used to implement and/or be implemented by any helper devices described herein, including helper device 104 of FIG. 1.

Since a helper device, such as the helper device 702, may not have a full-duplex radio (the lack of which may be desirable in practice for simplicity and low cost in some examples), there may be no direct communication channel from the backscatter device 706 device to the helper device 702. Accordingly, the process shown in FIG. 7 may be used to associate the devices in a network. The process including step 708, step 710, step 712, step 714, step 716, step 720, and step 722. While the steps are shown in a sequence in FIG. 7, it is to be understood that in some examples, the steps may be rearranged, some steps may not be present, and/or some steps may occur partially or wholly simultaneously with other steps.

In step 708, the helper device 702 may associate with the receiver 704 with two physical addresses (e.g. media access control (MAC) addresses such as MAC:1 and MAC:2). The helper device 702 may, in step 710, broadcast a discovery packet, for example using ON-OFF keying modulation, that contains these two physical addresses (e.g. MAC addresses) and Starts with a broadcast ID. Discovery packets with different broadcast IDs may be sent for each backscatter device in the network in some examples. In step 712, the backscatter device 706 transmits a backscatter packet (e.g. a Wi-Fi packet) including the source and destination addresses set to the provided physical addresses (e.g. MAC:2 and MAC:1). The backscatter packet payload may include a sensor update rate, packet length, supported bit rates and the physical (e.g. MAC) address of the backscatter device 706, MAC:3 in the example of FIG. 7. Other backscatter devices in the network may transmit analogous packets including the source address and destination address set to the provided physical addresses (e.g. MAC:2 and MAC:1).

In step 714, the packet from the backscatter device 706 may be routed by the receiver 704 to the helper device 702. The helper device 702 spoofs (e.g. mimics) the physical address of the backscatter device (e.g. MAC:3) and associates it with the receiver 704 in step 716. The helper device 702 selects a unique ID in step 718 and sends it to the backscatter device 706 along with other network (e.g. Wi-Fi network) credentials. In step 720, the backscatter device 706 responds with an acknowledgement packet (e.g. a Wi-Fi packet) including the source and destination addresses set to the physical address of the backscatter device (e.g. MAC:3) and the provided physical address (e.g. MAC:1). This acknowledgement packet gets routed through the receiver 704 in step 722 and confirms association at the helper device 702. After association, the backscatter device 706 can send packets (e.g. Wi-Fi packets) to the helper device 702 through the receiver 704, and change its parameters including update rate and packet length. The credentials for the spoofed physical (e.g. MAC) addresses could be sent securely using a manufacturer set secret key shared between the backscatter devices and the helper devices in a network.

EXAMPLE IMPLEMENTATIONS

Backscatter devices are described demonstrating implementation of all four 802.11b bit rates on an FPGA platform. Evaluation shows that Wi-Fi transmissions can be decoded on off-the-shelf smartphones and Wi-Fi chipsets over distances of 30-100 feet in various line of-sight and through-the-wall scenarios. A passive Wi-Fi integrated circuit (IC) is described that performs 1 Mbps and 11 Mbps 802.11b transmissions and the power consumption estimated using Cadence and Synopsis toolkits. Results show the 1 and 11 Mbps passive Wi-Fi transmissions consume 14.48 and 49.28 mW respectively.

Backscatter devices were implemented using an FPGA platform. This was used to characterize passive Wi-Fi (e.g. backscattered Wi-Fi) in various deployment scenarios. An IC design was used to quantify power consumption.

A backscatter device for backscattering Wi-Fi transmissions (e.g. passive Wi-Fi) was implemented using an FPGA for digital processing. The backscatter modulator included HMC190BMS8SPDT RF switch network on a 2-layer Rodgers 4350 substrate. The switch was designed to modulate between an open and closed impedance state and had a 1.1 dB loss. All the required baseband processing including data scrambling, header generation, DSSS/CCK encoding, CRC computation and DBPSK/DQPSK modulation were written in Verilog. The Verilog code was synthesized and translated onto DE1 Cyclone II FPGA development board by Altera. Four different frequency shifts were implemented at the backscatter device of 12.375, 16.5, 22 and 44 MHz. The digital output of the FPGA was connected to the backscatter switch to generate the Wi-Fi packets from the tone emitted by the helper device. A 2 dBi omnidirectional antenna was used on the backscatter device. The helper device uses a 6 dBi antenna and has a transmit power of 30 dBm.

For the integrated circuit implementation, note CMOS technology scaling has enabled the exponential scaling in power and area for integrated circuits. Wi-Fi chipsets have tried to leverage scaling but with limited success due to the need for power hungry analog components that do not scale in power and size with CMOS technology. However, baseband Wi-Fi operations are implemented in the digital domain and tend to scale very well with CMOS. For context, Atheros's AR6003 and AR9462 chipsets that were released in 2009 and 2012 use 65 nm CMOS and 55 nm CMOS node implementations respectively.

Figure 8:
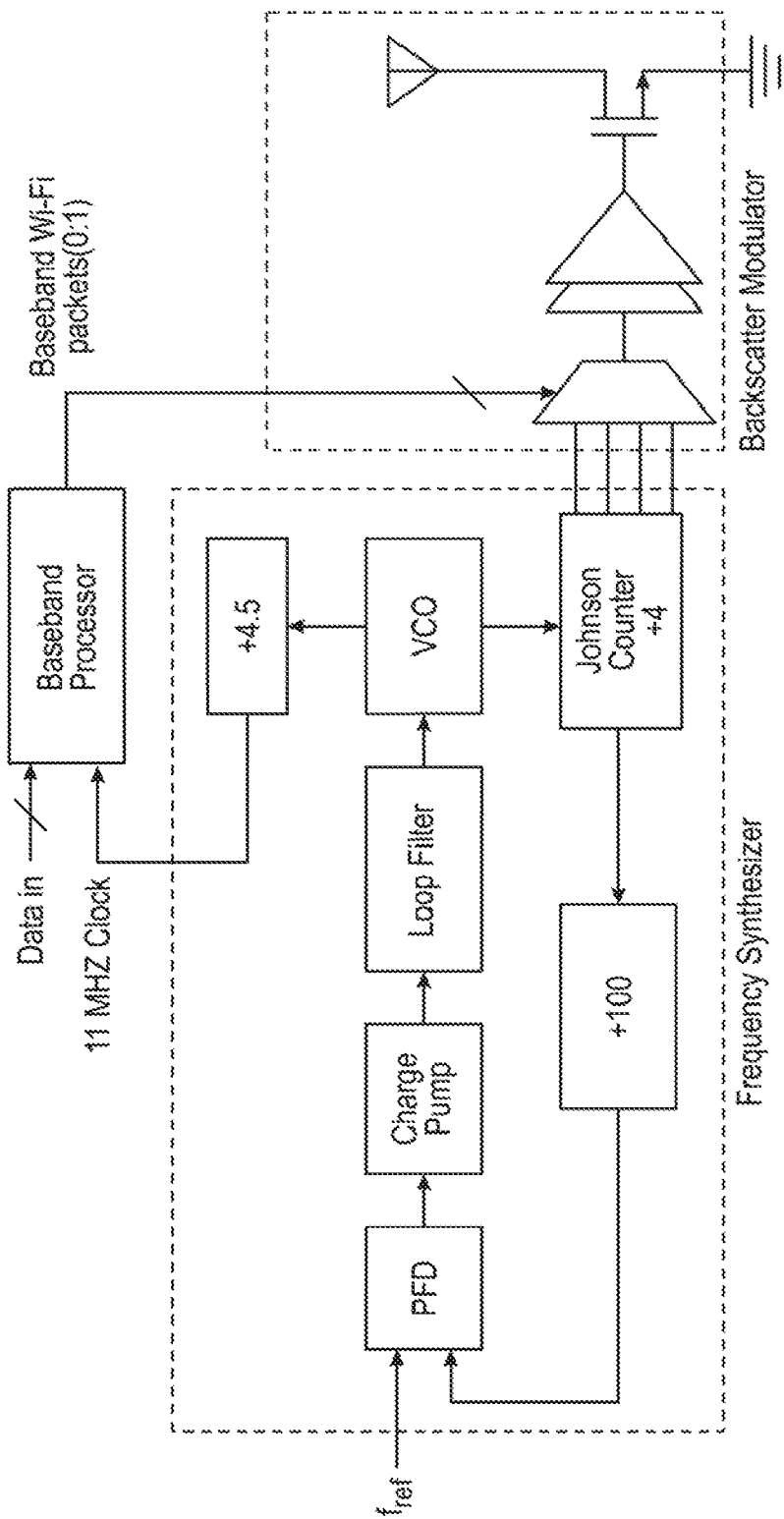
FIG. 8 is a schematic illustration of a backscatter device IC design arranged in accordance with examples described herein.

For the backscattering Wi-Fi device's integrated circuit implementation, the 65 nm LP CMOS node by TSMC was used, providing power savings of baseband processing and a comparison with current industry standards. FIG. 8 is a schematic illustration of an example IC architecture for backscatter devices described herein. The IC has three main components: a baseband frequency synthesizer, a baseband processor, and a backscatter modulator. The baseband frequency synthesizer generates the clock (e.g. 11 MHz) for baseband processing as well as four phases at 12.375 MHz offsets for DBPSK and DQPSK. The 11 MHz and 12.375 MHz clocks were phase synchronized to avoid glitches during phase modulation. An integer N charge pump and ring oscillator-based PLL were used to generate 49.5 MHz clock from a 12.375 kHz reference. The 49.5 MHz clock is fed to a quadrature Johnson counter to generate the four phases with the timing offsets (corresponding to 0, π/2, π and 3π/2 phases). The same 49.5 MHz carrier is divided by 4.5 to generate the 1 MHz baseband clock.

The baseband processor takes the payload bits as input and generates baseband 802.11b Wi-Fi packet. Verilog code that was verified on the FPGA was used and the Design Compiler by Synopsis to generate the transistor level implementation of the baseband processor.

The backscatter modulator mixes the baseband data to generate DBPSK and DQPSK and drives the switch to backscatter the incident tone signal. The baseband data are the select inputs to a 2-bit multiplexer which switches between the four phases of the 12.375 MHz clock to generate the phase modulated data. The multiplexer output is buffered and used to drive the RF switch, which toggles the antenna between open and short impedance state.

The IC implementation for 1 Mbps and 11 Mbps consumes a total of 14.5 and 49.3 mW of power respectively. The digital frequency synthesizer is clocked for DQPSK and consumes a fixed power for all data rates. The power consumption of the base-band processor that generates the 802.11b packets scales with the data rate and consumes 30% and 77% of total power for 1 and 11 Mbps respectively. The backscatter modulator consumes the rest of the power for performing phase modulation and running the switch.

From the foregoing it will be appreciated that, although specific embodiments of the invention have been described herein for purposes of illustration, various modifications may be made without deviating from the spirit and scope of the invention.

What is claimed is:

1. A backscatter device comprising:
   an antenna configured to backscatter a carrier signal having a first frequency;
   baseband circuitry configured to provide data for transmission;
   a waveform generator configured to provide a square wave having a second frequency, wherein the second frequency is a difference between the first frequency and a third frequency;
   a sub-carrier phase modulator coupled to the baseband circuitry and the waveform generator, the sub-carrier phase modulator configured to shift the square wave in accordance with the data to provide an output signal; and
   a switch coupled to the antenna, the switch configured to control the antenna to backscatter the carrier signal in accordance with the output signal such that the first frequency is mixed with the second frequency to transmit the data in a backscatter signal at the third frequency, wherein the backscatter signal is arranged in accordance with a wireless communication protocol implementing phase-shift keying.

2. The backscatter device of claim 1, wherein the backscatter signal is arranged in accordance with a wireless communication protocol implementing amplitude-shift keying.

3. The backscatter device of claim 2, wherein the wireless communication protocol comprises Wi-Fi, ZigBee, SigFox, or combinations thereof.

4. The backscatter device of claim 1, wherein the waveform generator is further configured to provide a waveform, wherein the waveform comprises an analog signal; a multi-level signal, or combinations thereof.

5. The backscatter device of claim 1, wherein the data comprises a Wi-Fi packet.

6. The backscatter device of claim 1, wherein the switch is configured to control the antenna to backscatter the carrier signal in accordance with the output signal to transmit the data at the third frequency and a fourth frequency.

7. The backscatter device of claim 1, further comprising multiple antennas, and wherein the carrier signal is provided using MIMO techniques.

8. A backscatter device comprising:
   an antenna, the antenna configured to backscatter a frequency hopped signal including a first frequency;
   baseband circuitry configured to provide data for transmission;
   a waveform generator configured to provide a square wave having a second frequency and further configured to hop the second frequency in accordance with the frequency hopped signal;
   a sub-carrier phase modulator coupled to the baseband circuitry and the waveform generator, the sub-carrier phase modulator configured to shift the square wave in accordance with the data to provide an output signal; and
   a switch coupled to the antenna, the switch configured to control the antenna to backscatter the carrier signal in accordance with the output signal such that the first frequency is mixed with the second frequency to transmit the data in a backscatter signal at a third frequency, wherein the backscatter signal is arranged in accordance with a wireless communication protocol implementing phase-shift keying.

9. The backscatter device of claim 8, wherein the waveform generator is further configured to provide a waveform, wherein the waveform comprises a square wave, analog signal, multi-level signal, or combinations thereof.

10. The backscatter device of claim 8, wherein the frequency hopped signal comprises a sequence of frequencies, and wherein the sequence of frequencies is received by the backscatter device over a downlink from a device configured to transmit the carrier signal.

11. The backscatter device of claim 8, wherein the frequency hopped signal comprises a sequence of frequencies, and wherein the backscatter device further comprises a memory configured to store the sequence of frequencies.

12. The backscatter device of claim 11, wherein the sequence of frequencies comprises a pseudorandom sequence.

13. The backscatter device of claim 8, wherein the first frequency is mixed with the second frequency to transmit the data in the backscatter signal at the third frequency, and wherein the backscatter signal comprises a signal in accordance with a wireless communication protocol selected from the group of protocols consisting of Wi-Fi, ZigBee, SigFox, and combinations thereof.

14. The backscatter device of claim 8, further comprising frequency determination circuitry coupled to the antenna, the frequency determination circuitry configured to provide an indication of the second frequency to the waveform generator at least in part by sensing the first frequency of the carrier signal and computing a difference between the first frequency and the third frequency.

15. A system comprising:
a helper device configured to transmit a carrier signal including a first frequency;
a backscatter device configured to backscatter the carrier signal using sub-carrier shift modulation with a square wave having a second frequency, the backscatter device configured to backscatter the carrier signal into a backscatter signal at a third frequency, the third frequency equal to a combination of the first and second frequencies, wherein the backscatter signal is arranged in accordance with a wireless communication protocol implementing phase-shift keying; and
a receiver configured to receive the backscatter signal at the third frequency.

16. The system of claim 15, wherein the backscatter device is further configured to provide data in the backscatter signal using amplitude shift keying.

17. The system of claim 15, further comprising a plurality of helper devices including the helper device and a plurality of receivers including the receiver, wherein the helper device is selected from the plurality of helper devices to provide the carrier signal based, at least in part, on a proximity of the helper device to the backscatter device.

18. The system of claim 17, wherein each of the plurality of helper devices is configured to provide the carrier signal in one mode and to receive the backscatter signal in another mode.

19. The system of claim 15, wherein the helper device and the receiver are separate electronic devices.

20. The system of claim 15, wherein the helper device and the receiver are integrated in a same device, the same device including cancellation circuitry configured to cancel the carrier signal at the receiver.

21. A backscatter device comprising:
an antenna configured to backscatter a carrier signal having a first frequency;
baseband circuitry configured to provide data for transmission;
a waveform generator configured to provide a waveform having a second frequency, wherein the second frequency is a difference between the first frequency and a third frequency;
a sub-carrier phase modulator coupled to the baseband circuitry and the waveform generator, the sub-carrier phase modulator configured to adjust a phase, amplitude, or combinations thereof, of the waveform in accordance with the data to provide an output signal; and
a switch coupled to the antenna, the switch configured to control the antenna to backscatter the carrier signal in accordance with the output signal such that the first frequency is mixed with the second frequency to transmit the data in a backscatter signal at the third frequency and a fourth frequency.

22. A backscatter device comprising:
an antenna, the antenna configured to backscatter a frequency hopped signal having a sequence of frequencies including a first frequency;
baseband circuitry configured to provide data for transmission;
a waveform generator configured to provide a waveform having a second frequency and further configured to hop the second frequency in accordance with the frequency hopped signal;
a sub-carrier phase modulator coupled to the baseband circuitry and the waveform generator, the sub-carrier phase modulator configured to adjust a phase, amplitude, or combinations thereof, of the waveform in accordance with the data to provide an output signal;
a switch coupled to the antenna, the switch configured to control the antenna to backscatter the carrier signal in accordance with the output signal such that the first frequency is mixed with the second frequency to transmit the data; and
a memory configured to store the sequence of frequencies.

23. A backscatter device comprising:
an antenna, the antenna configured to backscatter a frequency hopped signal including a first frequency;
baseband circuitry configured to provide data for transmission;
a waveform generator configured to provide a waveform having a second frequency and further configured to hop the second frequency in accordance with the frequency hopped signal;
a sub-carrier phase modulator coupled to the baseband circuitry and the waveform generator, the sub-carrier phase modulator configured to adjust a phase, amplitude, or combinations thereof, of the waveform in accordance with the data to provide an output signal;
a switch coupled to the antenna, the switch configured to control the antenna to backscatter the carrier signal in accordance with the output signal such that the first frequency is mixed with the second frequency to transmit the data; and
a frequency determination circuitry coupled to the antenna, the frequency determination circuitry configured to provide an indication of the second frequency to the waveform generator at least in part by sensing the first frequency of the carrier signal and computing a difference between the first frequency and the third frequency.

24. A system comprising:
a helper device configured to transmit a carrier signal including a first frequency;
a backscatter device configured to backscatter the carrier signal using sub-carrier modulation with a waveform having a second frequency, the backscatter device configured to backscatter the carrier signal into a backscatter signal at a third frequency, the third frequency equal to a combination of the first and second frequencies;
a receiver configured to receive the backscatter signal at the third frequency; and
a plurality of helper devices including the helper device and a plurality of receivers including the receiver, wherein the helper device is selected from the plurality of helper devices to provide the carrier signal based, at least in part, on a proximity of the helper device to the backscatter device.

* * * * *